US011865589B2

(12) United States Patent
Phelps et al.

(10) Patent No.: US 11,865,589 B2
(45) **Date of Patent: *Jan. 9, 2024**

(54) SYSTEM FOR AND METHOD OF BY-PRODUCT REMOVAL FROM A METAL SUBSTRATE

(71) Applicant: Texas Nameplate Company, Inc., Lancaster, TX (US)

(72) Inventors: Ronnie Dwaine Phelps, Dallas, TX (US); Preston Cray Smith, Dallas, TX (US); Joseph Wayne Deskin, Dallas, TX (US); Jon Loshinsky, Dallas, TX (US); Allan Stanfield, Dallas, TX (US)

(73) Assignee: Texas Nameplate Company, Inc., Lancaster, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/828,530

(22) Filed: May 31, 2022

(65) Prior Publication Data

US 2022/0288647 A1 Sep. 15, 2022

Related U.S. Application Data

(60) Division of application No. 17/371,284, filed on Jul. 9, 2021, which is a continuation of application No.

(Continued)

(51) Int. Cl.

*B08B 1/00* (2006.01)
*B08B 3/04* (2006.01)

(Continued)

(52) U.S. Cl.

CPC .............. *B08B 1/002* (2013.01); *A46B 13/02* (2013.01); *B08B 1/02* (2013.01); *B08B 3/022* (2013.01);

(Continued)

(58) Field of Classification Search

CPC .. B08B 1/002; B08B 1/02; B08B 3/14; B08B 3/022; B08B 3/041; B08B 17/025;

(Continued)

(56) References Cited

U.S. PATENT DOCUMENTS

| | | | |
|---|---|---|---|
| 5,540,245 | A | 7/1996 | Munakata et al. |
| 6,021,790 | A | 2/2000 | Yoshitani et al. |

(Continued)

OTHER PUBLICATIONS

U.S. Appl. No. 12/200,797, Crownover.

*Primary Examiner* — Benjamin L Osterhout

(74) *Attorney, Agent, or Firm* — Bradley Arant Boult Cummings LLP

(57) ABSTRACT

A system for and method of removing residues, deposits, and debris from a substrate that has been marked by a chemical etching process is disclosed. The system includes one or more upper sprayers that deposit a cleaning solution to a top surface of the product as it passes beneath the one or more upper sprayers. The system further includes at least one upper brush that operates to scrub the top surface of the product after the cleaning solution has been applied thereto. The system optionally includes one or more lower sprayers and lower brushes to clean a bottom surface of the product as it is conveyed through the system. The system further includes an air knife system that assists with drying the product prior to exiting the system. The system further includes a controller that is operable to adjust various system parameters.

20 Claims, 17 Drawing Sheets

Related U.S. Application Data

15/809,059, filed on Nov. 10, 2017, now Pat. No. 11,059,077, which is a continuation of application No. 14/598,653, filed on Jan. 16, 2015, now Pat. No. 9,839,942.

(60) Provisional application No. 61/928,063, filed on Jan. 16, 2014.

(51) Int. Cl.

| | |
|---|---|
| ***B08B 3/14*** | (2006.01) |
| ***B08B 1/02*** | (2006.01) |
| ***A46B 13/02*** | (2006.01) |
| ***B08B 3/02*** | (2006.01) |
| ***C23G 5/024*** | (2006.01) |
| ***C23G 5/04*** | (2006.01) |
| *B08B 17/02* | (2006.01) |

(52) U.S. Cl.
CPC ................ *B08B 3/041* (2013.01); *B08B 3/14* (2013.01); *C23G 5/024* (2013.01); *C23G 5/04* (2013.01); *B08B 17/025* (2013.01); *B08B 2203/0229* (2013.01)

(58) Field of Classification Search
CPC .. B08B 2203/0229; C23G 5/04; C23G 5/024; A46B 13/02
See application file for complete search history.

(56) References Cited

U.S. PATENT DOCUMENTS

| | | | | |
|---|---|---|---|---|
| 6,059,891 | A | 5/2000 | Kubota et al. | |
| 6,064,629 | A | 5/2000 | Stringer et al. | |
| 6,103,307 | A | 8/2000 | Taylor et al. | |
| 7,725,976 | B1 | 6/2010 | Crank et al. | |
| 7,806,986 | B2 | 10/2010 | Ueebisu | |
| 8,540,285 | B1 | 9/2013 | Crownover | |
| 9,839,942 | B1 * | 12/2017 | Phelps | C23G 5/024 |
| 11,059,077 | B2 * | 7/2021 | Phelps | B08B 3/14 |
| 11,370,000 | B2 * | 6/2022 | Phelps | C23G 5/04 |
| 2007/0251548 | A1 | 11/2007 | Lee et al. | |
| 2008/0105277 | A1 | 5/2008 | Boyd et al. | |
| 2014/0116574 | A1 | 5/2014 | Crownover | |
| 2018/0065158 | A1 | 3/2018 | Phelps et al. | |

* cited by examiner

SYSTEM FOR AND METHOD OF BY-PRODUCT REMOVAL FROM A METAL SUBSTRATE

CROSS-REFERENCE TO RELATED APPLICATIONS

This application is a divisional of and incorporates by reference the entire disclosure of U.S. patent application Ser. No. 17/371,284. U.S. patent application Ser. No. 17/371,284 is a continuation of U.S. Pat. No. 11,059,077. U.S. Pat. No. 11,059,077 is a continuation of U.S. Pat. No. 9,839,942. U.S. Pat. No. 9,839,942 claims priority from U.S. Provisional Patent Application No. 61/928,063.

BACKGROUND

It is often desirable to mark a product with information. For example, it may be desirable to imprint or otherwise affix a product name or model number onto a product. One way of affixing information to a product is by chemically etching the information into a surface on the product. An example of such a process is described in U.S. Pat. No. 8,540,285. At the end of a chemical etching process, the product may have various residues or deposits disposed about its surface. Manual cleaning processes can damage the product, create excess hazardous waste, and can present health risks to workers.

SUMMARY

A system includes a conveyor system that moves a product through various system modules that facilitate a cleaning process. In a typical embodiment, the conveyor system includes a set of lower rollers that are drive by a motor. Upon the product entering the system, the cleaning process begins by applying a cleaning solution to a top surface of the product. The cleaning solution is applied to the top surface of the product by one or more sprayers that are positioned above the product as the product is conveyed through the system. After the cleaning solution has been applied to the product, the product passes beneath a brush that is positioned above the conveyor system. The brush is positioned so that the brush contacts the top surface of the product to scrub away residues or deposits that are on the top surface of the product. The system also includes a fluid collector module that is positioned beneath the conveyor system. The fluid collector module includes: a collection tray to collect cleaning solution that has run off of the product; a filter media that extends between the conveyor system and the collection tray to filter the cleaning solution by removing deposits, debris, etc. that have been removed from the product; and a pump that feeds the collected cleaning solution back to the one or more sprayers. In a typical embodiment, the system also includes a drying module. The drying module can include an air knife system that includes one or more air knives that direct air at the product to dry the product. The drying module can also include one or more drying brushes.

In another embodiment, the system can include additional sprayers positioned beneath the conveyor system in order to apply the cleaning solution to a bottom surface of the product as the product moves through the system. In other embodiments, the system can include additional brushes to scrub the product as the product moves through the system. For example, additional brushes may be positioned above the conveyor system, and additional brushes may also be positioned below the conveyor system to scrub a bottom surface of the product.

BRIEF DESCRIPTION OF THE DRAWINGS

For a more complete understanding of the present invention thereof, reference may now be had to the following description taken in conjunction with the accompanying drawings, in which.

DETAILED DESCRIPTION

Various embodiments of the present invention will now be described more fully with reference to the accompanying drawings. The invention may, however, be embodied in many different forms and should not be construed as limited to the embodiments set forth herein.

Figure 1:
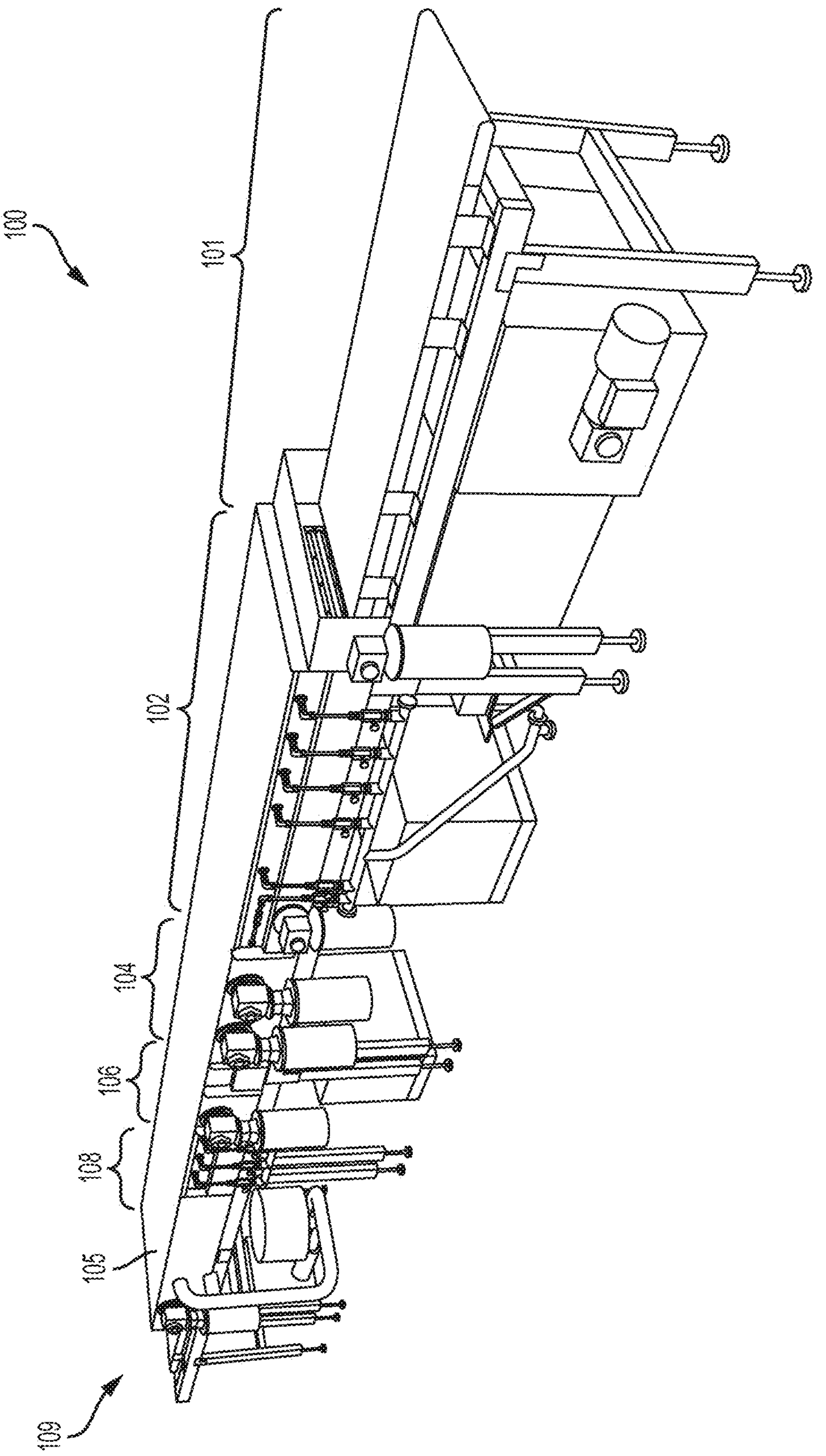
FIG. 1 is a perspective view of a substrate cleaning system.

Referring now to FIG. 1, a substrate cleaning system 100 with a cover 105 in place is shown in perspective view. The substrate cleaning system 100 includes the cover 105, a loading module 101, a breaking module 102, a scrubbing module 104, a rinsing module 106, a drying module 108, an unloading module 109, a solution storage and filtering module 110(1), and a solution storage and filtering module 110(2). In a typical embodiment, the substrate cleaning system 100 is enclosed by the cover 105 to minimize the escape of volatile organic compounds (VOC). For convenience, the cover 105 may include multiple smaller panels or fewer larger panels. In a typical embodiment, the cover 105 may be made from stainless steel. In another embodiment, one or more panels may be made of a transparent material such as glass.

A product 10 that is to be cleaned can come in various shapes and sizes. In a typical embodiment, the product 10 is a sheet of metal. For example, the product 10 may be made of aluminum, steel, or the like. Depending on the needs for the product 10, various thicknesses ranging from thin sheets to thicker plates may be used.

Referring generally to FIGS. 3A, 4, 5, and 6, a plurality of automated rollers 111 extend a length of substrate cleaning system 100 and are generally disposed within the breaking module 102, the scrubbing module 104, the rinsing module 106, and the drying module 108. For purposes of clarity of the FIGURES, not all of the automated rollers 111 are indicated by reference numbers, but those having skill in the art will recognize the presence thereof in the FIGURES. The plurality of automated rollers 111 may be driven in various ways. In a typical embodiment, the plurality of automated rollers 111 include a lower roller 112 and an upper roller 113. Each lower roller 112 has disposed on an end a stacked pair of gears. In this embodiment, a first lower roller 112 is connected to a motor via one of the stacked pair of gears. The first lower roller 112 is connected to an adjacent second lower roller 112 via the second gear of the stacked pair of gears. This pattern of connecting lower rollers 112 may be repeated to connect as many lower rollers 112 as is needed. In this way, the plurality of automated rollers 111 may be driven by as few as one motor. An example of a motor that drives a plurality of automated rollers 111 is a motor 135 of FIG. 3A. When the first lower roller 112 is driven by the motor, each additional connected lower roller 112 rotates. This rotation causes a product 10 resting thereon to be conveyed along the lower rollers 112. In this way, the product 10 passes from one module to the next for an automated cleaning process. The spacing between each of the plurality of automated rollers 111 can be changed as desired, but should be such that at least two of the plurality of automated rollers 111 support the product 10 as the product 10 moves through the substrate cleaning system 100.

In a typical embodiment, the plurality of automated rollers 111 include lower rollers 112 and upper rollers 113, which lower rollers 112 and upper rollers 113 permit the product 10 to pass between the lower rollers 112 and the upper rollers 113. A space between the upper rollers 113 and lower rollers 112 is adjustable to permit products 10 with different thickness to pass between the lower rollers 112 and the upper rollers 113. In one embodiment, the upper rollers 113 can move vertically relative to the lower rollers 112 to permit different thicknesses of products to pass between the lower rollers 112 and the upper rollers 113. In such an embodiment, for example, each end of the upper rollers 113 may be positioned in vertical slots that permit each upper roller 113 to independently move vertically. The upper roller 113 may further include a spring to bias the upper roller 113 in a downward direction. In such an embodiment, as the product 10 passes between the lower rollers 112 and the upper rollers 113, the product 10 pushes the upper rollers 113 up as much as is needed to allow enough space for the product 10 to pass through the lower rollers 112 and the upper rollers 113. In this embodiment, the spring drives the upper roller 113 down towards the product 10 to help secure the product 10 between the upper roller 113 and the lower roller 112.

The lower rollers 112 and the upper rollers 113 include one or more hub portions 114. Each of the hub portions 114 includes a raised portion that includes a material, such as urethane, that provides additional gripping ability to the lower rollers 112 and the upper rollers 113. The additional grip provided by the urethane reduces a likelihood that a product 10 resting upon the urethane hub portion 114 will slip relative to the rotation the plurality of automated rollers 111. In addition to providing more grip, urethane is resistant to various abrasive chemicals, including various types of solvents. In other embodiments, other materials may be used instead of neoprene as long as the material does not quickly deteriorate in the presence of solvents that may come in contact with the material during the automated cleaning process.

In another embodiment, a first drive motor may be used to drive a first set of automated rollers, and a second drive motor may be used to drive a second set of automated rollers. In yet another embodiment, a plurality of motors may be used to drive a plurality of automated roller sets. Examples of motors that may be used to drive the plurality of automated roller sets includes motor 135 and motor 167. In various embodiments, the plurality automated rollers 111 can be used throughout the substrate cleaning system 100.

Figure 2:
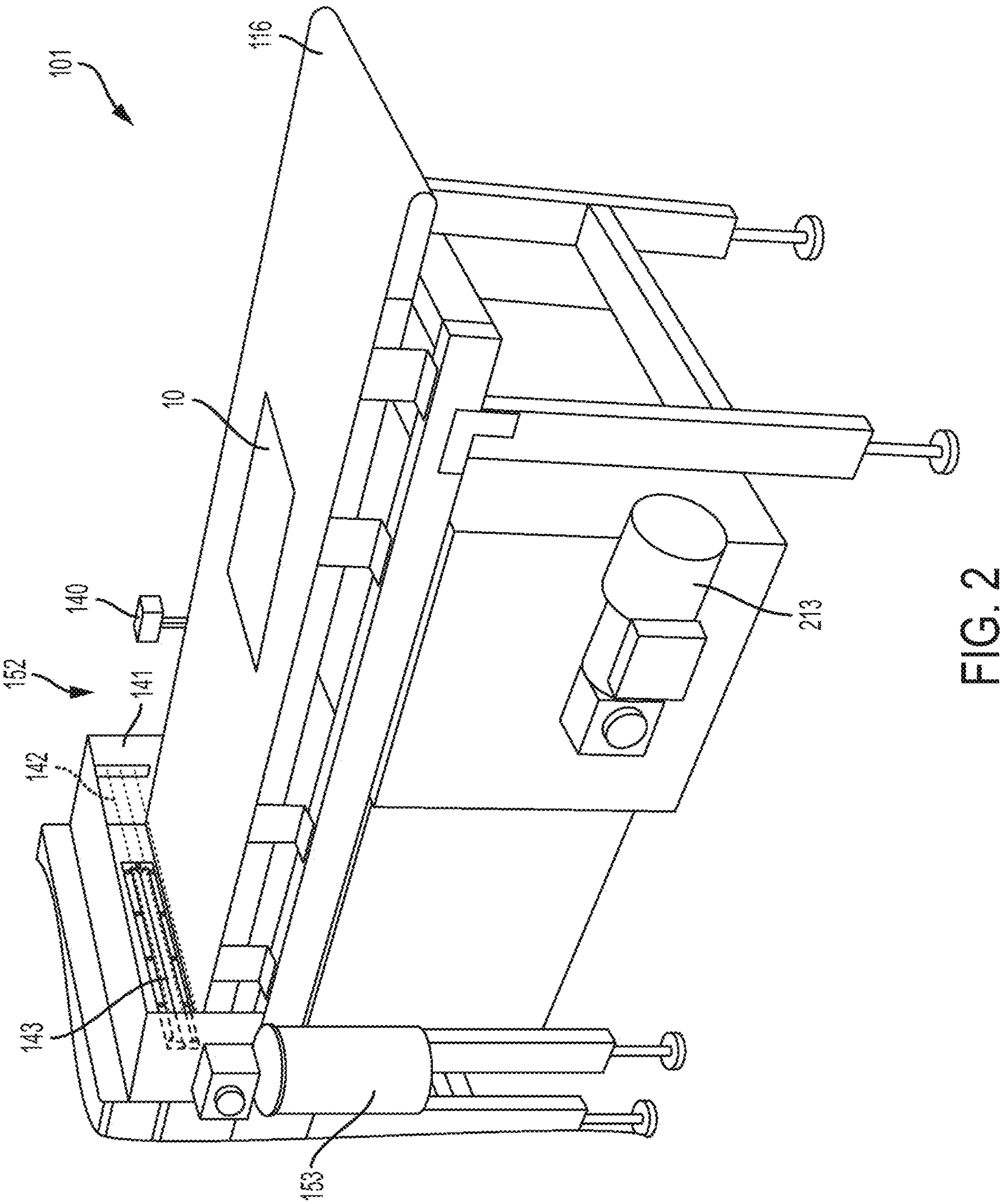
FIG. 2 is a perspective view of a loading module of a substrate cleaning system.

Referring now to FIG. 2, the loading module 101 of the substrate cleaning system 100 is shown in perspective view. As shown in FIG. 2, a side portion of the substrate cleaning machine 100 has been removed in order to provide a better view of the inner workings of the substrate cleaning system 100. The product 10 that needs to be cleaned enters the substrate cleaning system 100 at the loading module 101. The loading module 101 includes a conveyor 116, a conveyor motor 153, and an entrance module 152. The product 10 is placed onto a conveyor 116 of the loading module 101 with chemically etched graphics facing up. The entrance module 152 includes a product detector 140 and a light curtain 141. The product detector 140 detects the presence of the product 10 once the product 10 has been loaded onto the conveyor 116. The product detector 140 can include various sensor types, such as, for example, optical, weight based, etc. When the product detector 140 detects the product 10, the conveyor 116 is driven by the conveyor motor 153 to carry the product 10 towards the light curtain 141 of the entrance module 152.

The light curtain 141 is a safety device that uses one or more light beams 142 to detect a presence of objects, such as a hand of a person. In the event that an object enters a path of the one or more light beams 142, the light curtain 141 sends a signal to a controller 301 to shut down the substrate cleaning system 100. In a typical embodiment, the one or more light beams 142 should be located at a height above the conveyor 116 that allows the product 10 to just pass beneath the one or more light beams 142 without interrupting the one or more light beams 142. After the product 10 passes through the light curtain 141, the product 10 passes through an entrance slit 143. In a typical embodiment, the entrance slit 143 is made of urethane and includes two sealing members 123 that overlap to form a sealing slit (best seen in FIG. 8). Upon passing through the entrance slit 143, the product 10 leaves the loading module 101 and enters the breaking module 102.

Figure 3A:
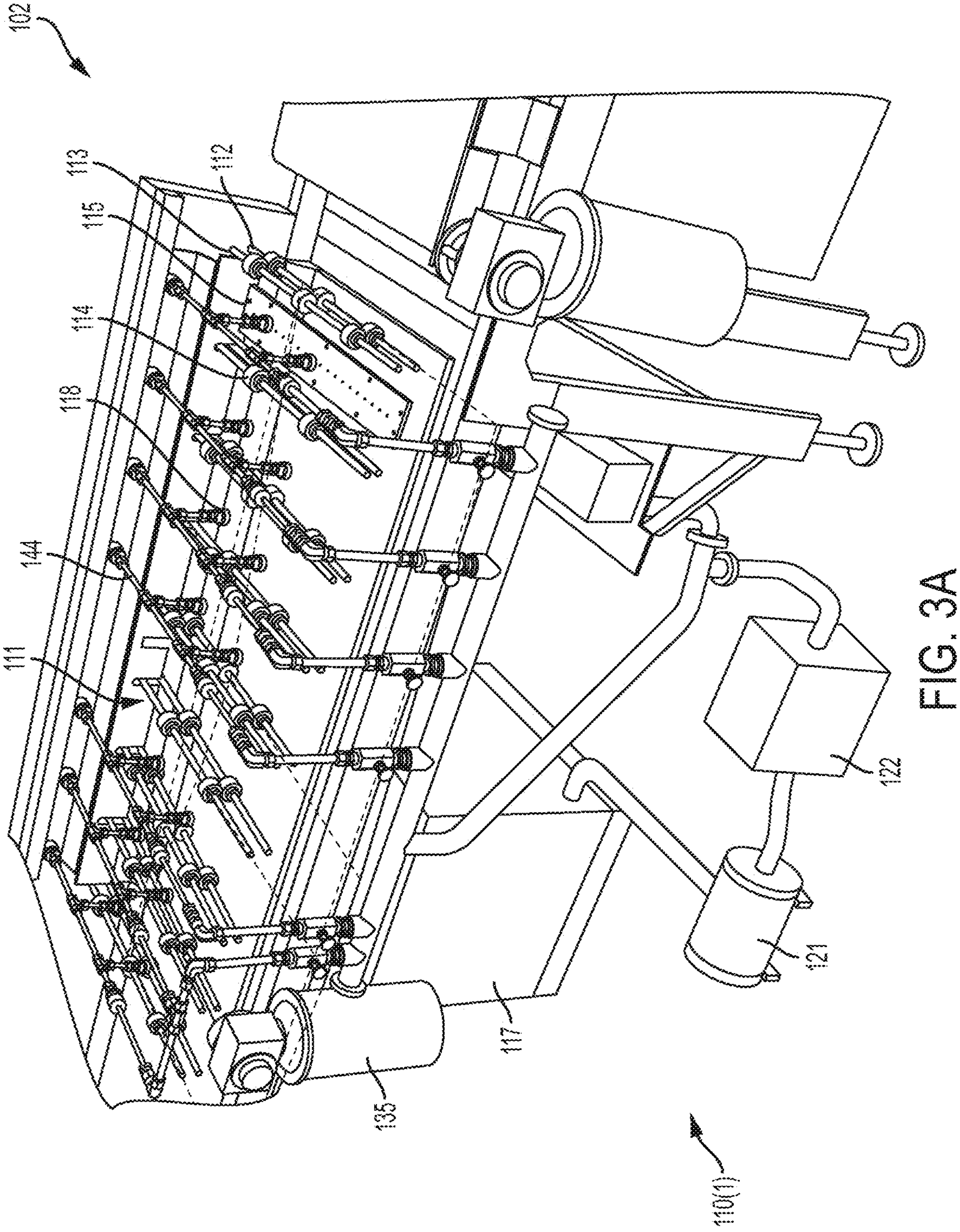
FIG. 3A is a perspective view of a breaking module of a substrate cleaning system.

Referring now to FIG. 3A, the breaking module 102 of the substrate cleaning system 100 is shown in perspective view. As shown in FIG. 3A, a side portion of the substrate cleaning machine 100 has been removed in order to provide a better view of the inner workings of the substrate cleaning system 100. The breaking module 102 includes a plurality of nozzles 118, a plurality automated rollers 111, one or more under sprayers 115, and a motor 135. As the product 10 passes through the breaking module 102, the product 10 passes underneath the plurality of nozzles 118 and above the one or more under sprayers 115. The plurality of nozzles 118 are distributed above a length of the breaking module 102 and are connected to the solution storage and filtering module 110(1) via a network of tubes. The solution storage and filtering module 110(1) includes a tank 117, a pump 121, and a heat exchanger 122. The first cleaning solution 120 is stored in the tank 117. The pump 121 pulls the first cleaning solution 120 from the tank 117 and directs the first cleaning solution 120 through the heat exchanger 122 where the first cleaning solution 120 may be heated or cooled as desired prior to being fed to the plurality of nozzles 118.

In one embodiment, the plurality of nozzles 118 extend from plumbing 144 that is positioned above the plurality automated rollers 111. The plumbing 144 includes rigid piping that both provides structure to suspend the plurality of nozzles 118 over the plurality of automated rollers 111 of the breaking module 102 and feeds the first cleaning solution 120 to the plurality of nozzles 118. The plurality of nozzles 118 pour the first cleaning solution 120 onto the products 10 that pass through the breaking module 102. The number of nozzles 118 that are included in the breaking module 102 can be increased or reduced as desired. Changing the number of nozzles 118 may accomplished by adding additional nozzles 118 to the plumbing 144 or by adding additional rows of plumbing 144.

Figure 3B:
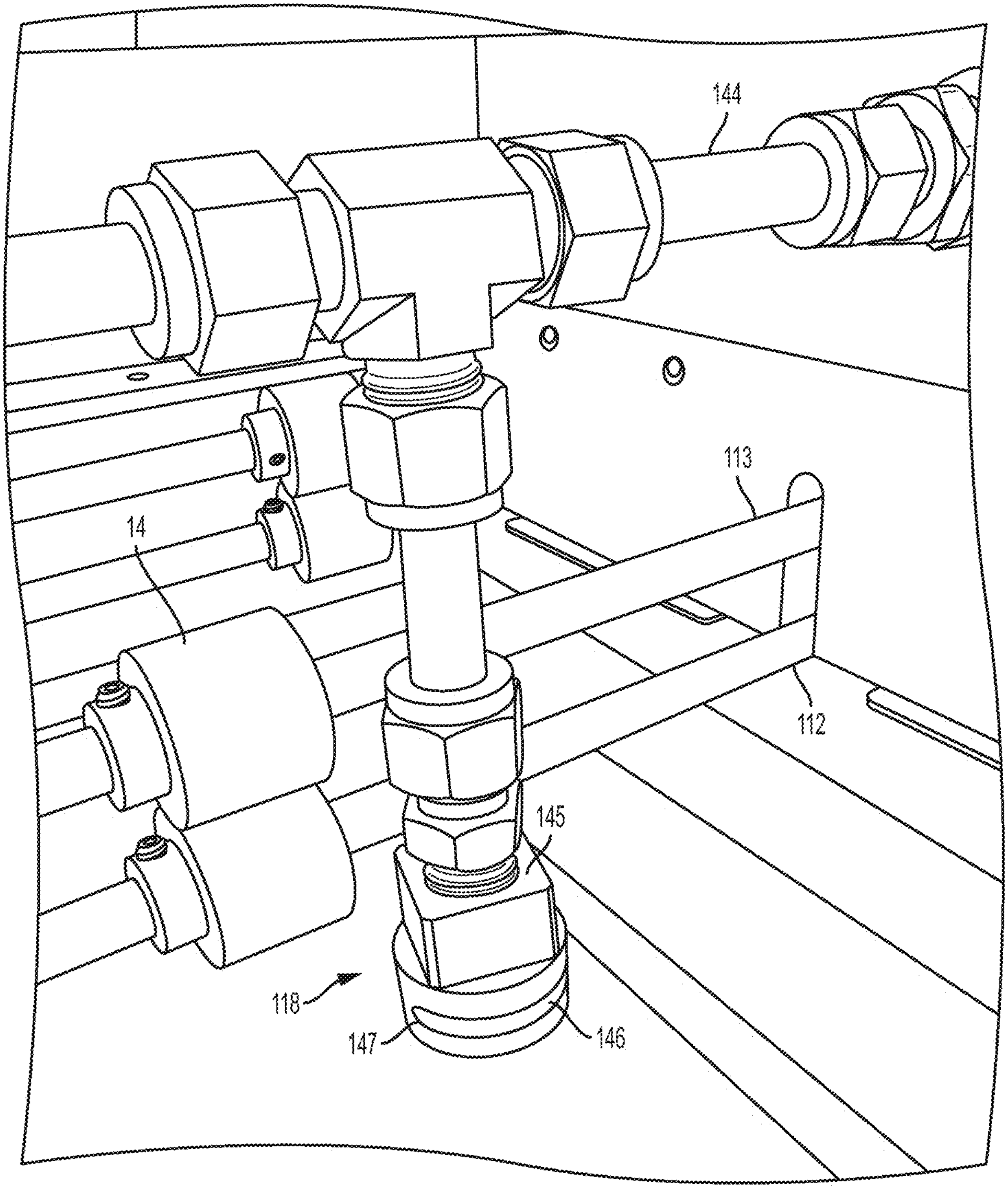
FIG. 3B is a perspective view of an upper sprayer.

Referring now to FIG. 3B, the plurality of nozzles 118 dispense the first cleaning solution 120 onto the product 10 in a smooth, laminar flow in order to saturate a top surface of the product 10. As shown, a nozzle of the plurality of nozzles 118 include a central bore 145 that intersects a semicircular slotted portion 146. The semicircular slotted portion 146 intersects the central bore 145 such that an edge of the central bore 145 meets a curved edge 147 of the slotted portion 146. A nozzle of this type maintains the surface tension of the first cleaning solution 120 to facilitate pooling of the first cleaning solution 120 on the top surface of the product 10, which pooling permits the first cleaning solution 120 to completely cover the top surface of the product 10 to dissolve and breakup chemicals, deposits, debris, etc. from the top surface of the product 10. Dispensing the cleaning solution 120 in a smooth, laminar manner has an added benefit of reducing atomization of the first cleaning solution 120, which reduction reduces emission of VOCs by the substrate cleaning system 100. In another embodiment, a valve of a different design may be used. Operation of the solution storage and filtering module 110(1) and the solution storage and filtering module 110(2) will be discussed in greater detail below.

Figure 3C:
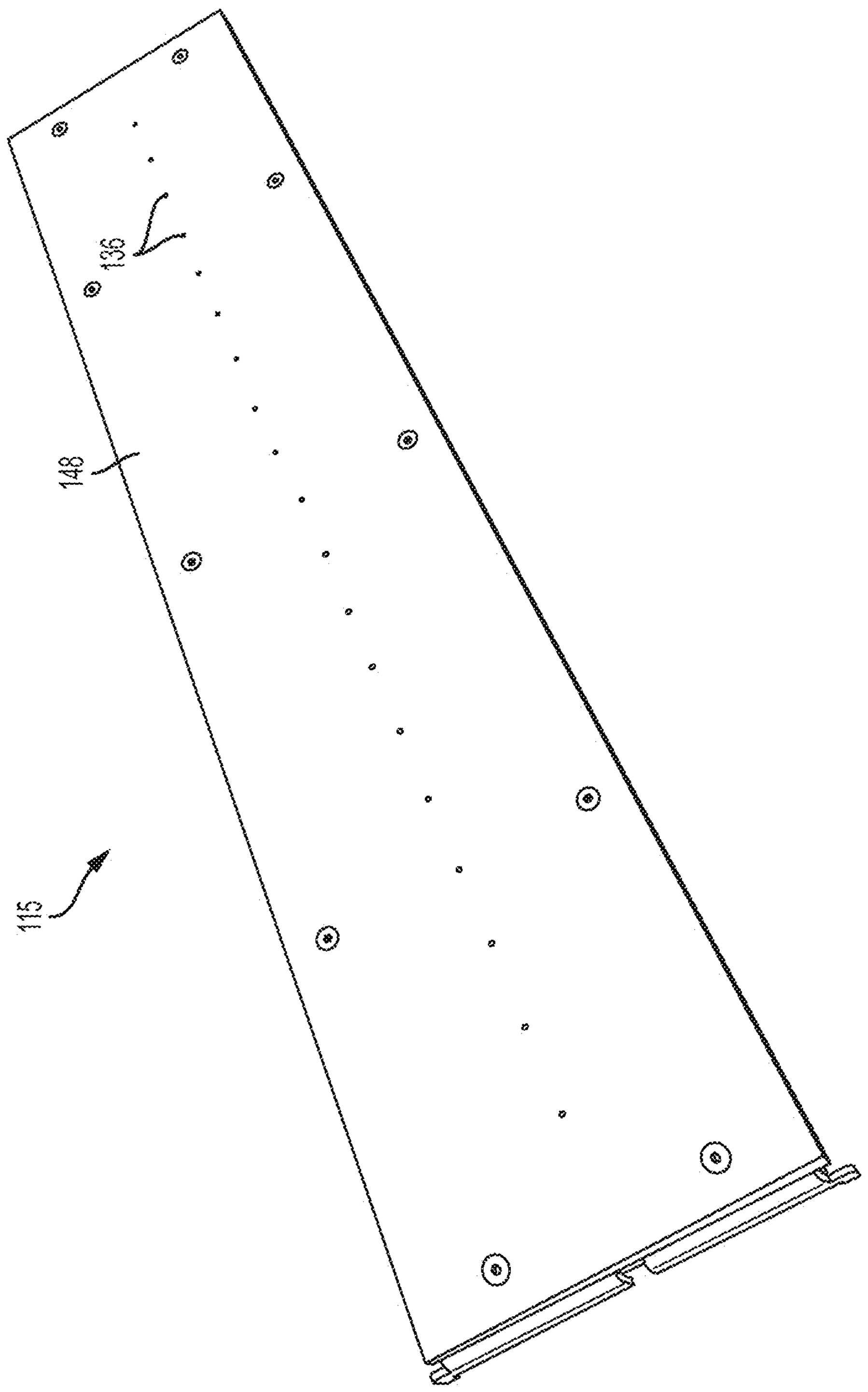
FIG. 3C is a perspective view of an under sprayer.

Referring now to FIGS. 3A and 3C, an under sprayer 115 is shown installed in gaps between adjacent automated rollers 111. The under sprayer 115 is placed slightly beneath a level of the lower rollers 112 in modules 102, 104, and 106 of the substrate cleaning system 100. The under sprayer 115 includes a hollow plank 148 and a plurality of spray holes 136. The hollow plank 148 is in fluid communication with the same fluid system as the plurality of nozzles 118 and allows the first cleaning solution 120 to be communicated to a back side of the product 10 from the spray holes 136. The back surface of the product 10 is often coated with resins or other deposits during the etching process to protect the back surface of the product 10. After the etching process has ended, it is often desirable to remove the resins or other protective means from the back surface. The under sprayer 115 beneath the plurality of automated rollers 111 of the breaking module 102 enables the substrate cleaning system 100 to more efficiently coat a back surface of the product 10 with the first cleaning solution 120 as the product 10 passes through the substrate cleaning system 100, and the under sprayer 115 further acts as guide that prevents the product 10 from falling down beneath the plurality of automated rollers 111 of the breaking module 102. Although only one under sprayer 115 is shown in FIG. 3A, a person having ordinary skill in the art will recognize that additional under sprayers 115 may be included between additional adjacent automated rollers 111 throughout the substrate cleaning system 100 as desired.

In a typical embodiment, the first cleaning solution 120 is a solvent that dissolves or breaks up chemicals, deposits, debris, etc. on a surface of the product 10. According to one embodiment, the first cleaning solution 120 is heated. Heating the first cleaning solution 120 assists with the breakup and removal of chemicals, deposits, debris, etc. from a surface of the product 10. In another embodiments, the first cleaning solution 120 is not heated. In yet another embodiment, the first cleaning solution 120 may be cooled. In a typical embodiment, the first cleaning solution 120 is heated or cooled as necessary to maintain the first cleaning solution 120 at a temperature close to but beneath a boiling point of the first cleaning solution 120. In one embodiment, a temperature of the first cleaning solution 120 is maintained from about 95 degrees Fahrenheit to about 100 degrees Fahrenheit. In various embodiments, the first cleaning solution 120 is a high-flash naphtha 100 solution.

While moving through the breaking module 102, the product 10 is carried at a speed that allows the first cleaning solution 120 enough time to break up or free chemicals or deposits present on the product 10 before the product 10 exits the breaking module 102. In one embodiment, a speed that the product 10 travels through the substrate cleaning system 100 is between 30 and 60 inches per minute. In another embodiment, the speed that the product 10 travels through the substrate cleaning system 100 may be greater than 60 inches per minute. In yet another embodiment, the speed that the product 10 travels through the substrate cleaning system 100 may be less than 30 inches per minute. In another embodiment, the product 10 may periodically stop while in the substrate cleaning system 100. When the product 10 stops, it may be necessary to also stop one or more of the brushes within the substrate cleaning system 100 so as not to damage the product 10 that may have stopped beneath a brush. Upon exiting the breaking module 102, the product 10 enters the scrubbing module 104.

Figure 4:
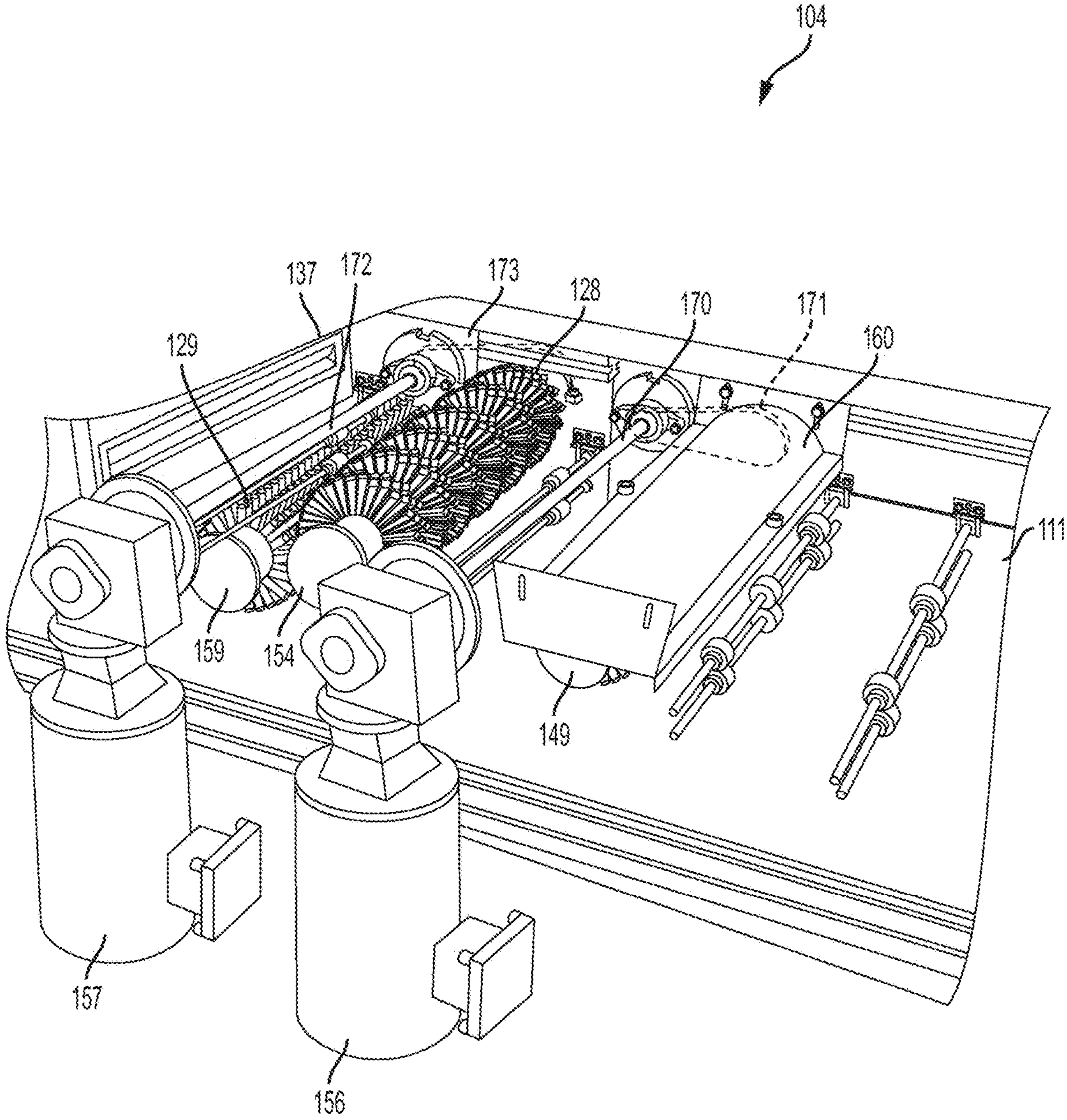
FIG. 4 is a perspective view of a breaking module of a substrate cleaning system.

Referring now to FIG. 4, the scrubbing module 104 is shown in perspective view. As shown in FIG. 4, a side portion of the substrate cleaning machine 100 has been removed in order to provide a better view of the inner workings of the substrate cleaning system 100. The scrubbing module 104 includes a plurality of automated rollers 111, a first upper spiral brush 149, a second upper spiral brush 154, a lower brush 159, a motor 156, and a motor 157. The first upper spiral brush 149 and the second upper spiral brush 154 are disposed across a width of the scrubbing module 104 and are further disposed at an appropriate height above the plurality of automated rollers 111 of the scrubbing module 104 to permit contact between the first upper spiral brush 149 and the second upper spiral brush 154 with the product 10 as the product 10 passes beneath the first upper spiral brush 149 and the second upper spiral brush 154. The lower brush 159 is positioned beneath the plurality of automated rollers 111 of the scrubbing module 104 and is further disposed at an appropriate depth to permit contact with the product 10 as the product 10 passes above the lower brush 159. In a typical embodiment, a height of the first upper spiral brush 149 and the second upper spiral brush 154 is adjustable. The first upper spiral brush 149 is driven by the motor 156. A drive shaft 170 extends across the scrubbing module 104 from the motor 156. The drive shaft 170 is connected to the first upper spiral brush 149 via a belt 171.

The second upper spiral brush 154 is connected to the motor 157 by a drive shaft 172 and a belt 173. The lower brush 159 is similarly connected to the motor 157 by the drive shaft 172 and an additional belt. Though not explicitly shown, a person having ordinary skill in the art would recognize that the belt 173 could be adapted to also drive the lower brush 159. In a typical embodiment, the first upper spiral brush 149, the second upper spiral brush 154, and the lower brush 159 spin at around 300 revolutions per minute. In another embodiment, the first upper spiral brush 149, the second upper spiral brush 154, and the lower brush 159 can be operated at higher or lower speeds depending on design considerations such as the type of material being cleaned, the type of cleaning fluid being used, etc.

Figure 9:
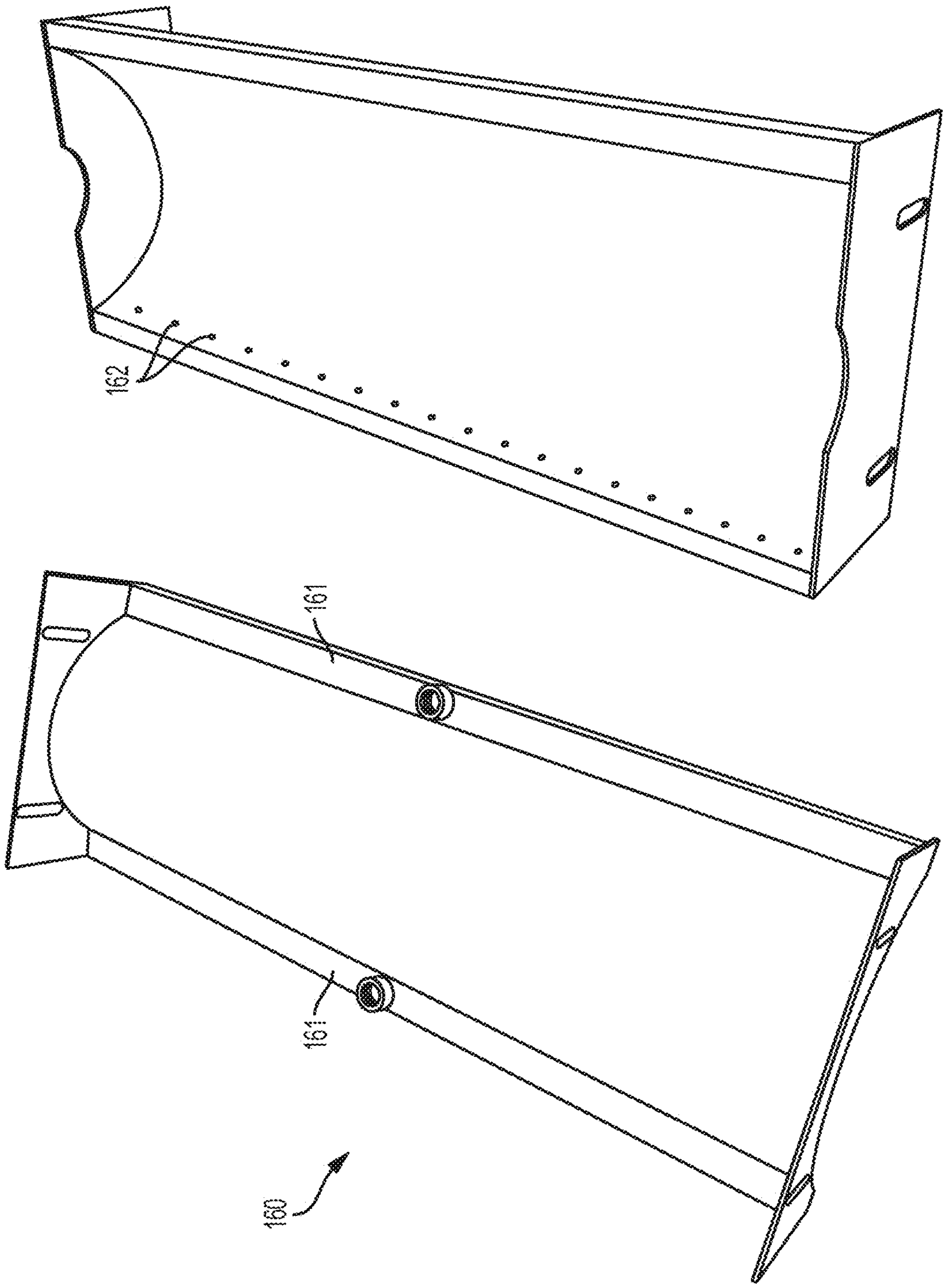
FIG. 9 shows perspective top and bottom views of a brush fender of a substrate cleaning system.

In a typical embodiment, the first upper spiral brush 149 includes bristles that are helically disposed about a central portion of the first upper spiral brush 149. As shown in FIG. 4, a top portion of the first upper spiral brush 149 is covered by a fender 160 (best seen in FIG. 9). In a typical embodiment, the fender 160 serves two purposes. The first is to prevent the first cleaning solution 120 from being scattered unnecessarily within the substrate cleaning system 100. The second is to supply the first upper spiral brush 149 with additional first cleaning solution 120. Spraying the first upper spiral brush 149 with additional first cleaning solution 120 helps keep the first upper spiral brush 149 clean. To supply the first upper spiral brush 149 with additional cleaning solution 120, the fender 160 includes a pair of fluid manifolds 161. Each fluid manifold 161 includes a plurality of holes 162 on an inside portion of the fender 160. The fender 160 is in fluid communication with the solution storage and filtering module 110(1). In a typical embodiment, each of the upper spiral brushes within the substrate cleaning system 100 includes a fender 160. In another embodiment, one or more upper brushes may not include a fender 160.

The second upper spiral brush 154 includes bristles 128 that are helically disposed about a central portion of the second upper spiral brush 154, but spiral in a direction opposite to that of the helically-disposed bristles of the first upper spiral brush 149. The first upper spiral brush 149 rotates to feed brushed chemicals, deposits, debris, etc. in a first direction, and the second upper spiral brush 154 rotates in a second direction opposite to the first direction to feed brushed chemicals, deposits, debris, etc. away from the product 10. In another embodiment, scrubbing modules 104 utilizing principles of the invention may include more or fewer brushes as desired. Additional brushes may require the use of additional motors and extending a length of the scrubbing module 104.

In a typical embodiment, bristles 128 can be made of various types of materials depending on various design considerations. For example, if the product 10 is made of a relatively soft aluminum, softer bristles 128 may be desirable. If the product 10 is made of steel, stiffer bristles 128 may be used without fear of damaging a surface of the product 10. In a typical embodiment, the bristles 128 are made of nylon. Nylon is resistant to abrasive chemicals, such as the first cleaning solution 120. In a typical embodiment, bristles for each brush within the substrate cleaning system may be made of nylon or a similar material.

The lower brush 159 includes straight bristles 129 and rotates in a direction opposite to movement of the product 10 that passes above the lower brush 159. In another embodiment, the bristles 129 are disposed about a central portion of the lower brush 159 randomly. In another embodiment, the lower brush 159 rotates in a same direction as the product 10 that passes above the lower brush 159. Similar to the bristles 128, and the bristles 129 can be made of various materials depending on design preferences. After passing through the scrubbing module 104, the product 10 exits through a scrubbing module exit 137. The scrubbing module exit 137 prevents the first cleaning solution 120 from entering the rinsing module 106. In a typical embodiment, the scrubbing module exit includes a doorway seal, such as the one shown in FIG. 8. As discussed in more detail below, it may be desirable to keep the first cleaning solution 120 from mixing with a cleaning solution that is used in the rinsing module 106.

Figure 5:
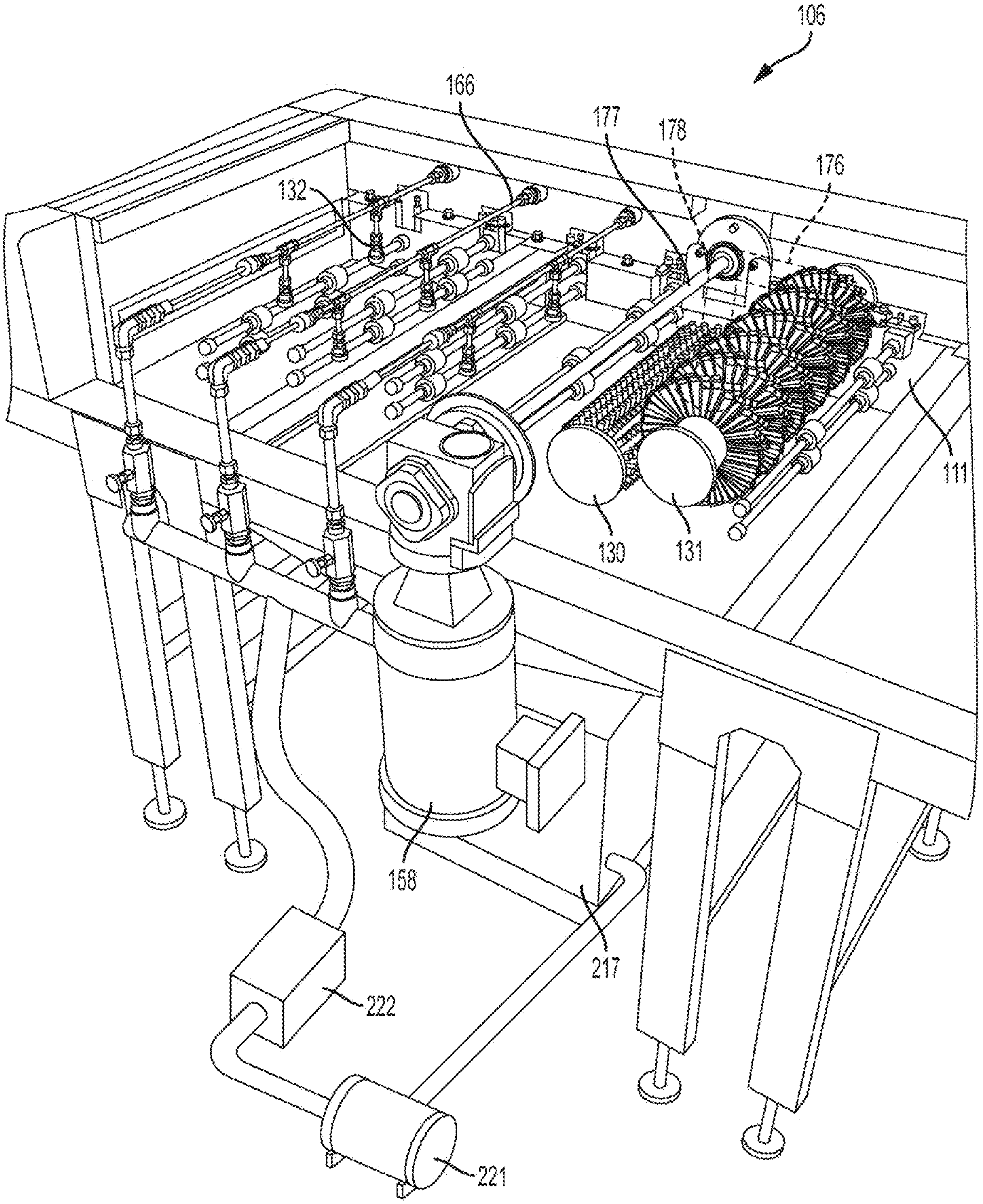
FIG. 5 is a perspective view of a rinsing module of a substrate cleaning system.

Referring now to FIG. 5, the rinsing module 106 of the substrate cleaning system 100 is shown in perspective view. As shown in FIG. 5, a side portion of the substrate cleaning machine 100 has been removed in order to provide a better view of the inner workings of the substrate cleaning system 100. The rinsing module 106 includes a plurality of automated rollers 111, a lower brush 130, an upper brush 131, a plurality of nozzles 132, and a motor 158. As the product 10 enters the rinsing module 106, the product 10 passes beneath the upper brush 131. For clarity, a fender 160 is not shown covering the upper brush 131. Though not explicitly required, a fender 160 is included in a typical embodiment. After passing the upper brush 131, the product 10 next passes above the lower brush 130. The upper brush 131 and the lower brush 130 are driven by the motor 158. The upper brush 131 is driven by the motor 158 via a drive shaft 177 and a belt 176. The lower brush 130 is also driven by the motor 158 via the drive shaft 177 and a belt 178. In another embodiment, more or fewer brushes may be included in the rinsing module 106. In a typical embodiment, the upper brush 131 includes spiraled bristles and the lower brush 130 includes straight bristles. However, in other embodiments, straight or spiraled bristles may be substituted as desired.

The lower brush 130 is disposed beneath the plurality of automated rollers 111 of the rinsing module 106 to allow the product 10 to pass above the lower brush 130. As the product 10 passes over the lower brush 130, a backside of the product 10 is scrubbed to remove chemicals, deposits, debris, etc. therefrom. According to one embodiment, the lower brush 130 rotates in a direction opposite to movement of the product 10. In another embodiment, the lower brush 130 rotates in a same direction as movement of the product 10.

In a typical embodiment, the lower brush 130 and the upper brush 131 spin at approximately 300 revolutions per minute, though the speed may be increased or decreased as desired. As the product 10 passes beneath the upper brush 131 and the plurality of nozzles 132, loosened chemicals, deposits, debris, etc. are driven away from the product 10 by the scrubbing of the upper brush 131. After passing the lower brush 130, the product 10 passes beneath the plurality of nozzles 132.

The plurality of nozzles 132 are distributed along the length of the rinsing module 106 and function in a similar way to the plurality of nozzles 118 discussed above except that the plurality of nozzles 132 are fed cleaning solution from the solution storage and filtering module 110(2). In a typical embodiment, the second solution and filtering module 110(2) is used segregate the first cleaning solution 120 from the second cleaning solution 125. The plurality of nozzles 132 rinse a surface of the product 10 with the second cleaning solution 125 to rinse off any remnants of chemicals, deposits, debris, etc. from the product 10. In a typical embodiment, the plurality of nozzles 132 include a sprayer-type nozzle that sprays the cleaning solution 125 at a high velocity to drive chemicals, deposits, debris, etc. away from the product 10. In another embodiment, to reduce emission of VOCs or otherwise, the plurality of nozzles 132 may be of a similar design as the plurality of nozzles 118. The plurality of nozzles 132 are connected to the solution storage and filtering module 110(2) via a network of hoses or tubes. Similar to the plurality of nozzles 118, the plurality of nozzles 132 are suspended over the plurality of automated rollers 111 of the rinsing module 106 via plumbing 166 that both structurally supports the plurality of nozzles 132 and feeds the second cleaning solution 125 to the plurality of nozzles 132.

Similar to the solution storage and filtering module 110 (1), the solution storage and filtering module 110(2) includes a tank 217, a pump 221, and a heat exchanger 222. The second cleaning solution 125 is stored in the tank 217. The pump 221 pulls the second cleaning solution 125 from the tank and directs the second cleaning solution 125 through the heat exchanger 222 where the second cleaning solution 125 may be heated or cooled as desired prior to being fed to the plurality of nozzles 132. In a typical embodiment, the second cleaning solution 125 is heated or cooled as necessary to maintain the second cleaning solution 125 at a temperature beneath a boiling point of the second cleaning solution 125. In one embodiment, a temperature of the second cleaning solution 125 is maintained from about 95 degrees Fahrenheit to about 100 degrees Fahrenheit. In various embodiments, the second cleaning solution 125 is a high-flash naphtha 100 solution.

In a typical embodiment, the second cleaning solution 125 is a standard naphtha solution and is stored in the solution storage and filtering module 110(2). In another embodiment, the first cleaning solution 120 and the second cleaning solution 125 may both be either the high-flash naptha 100 or a standard naptha solution. Upon exiting the rinsing module 106, the product 10 enters the drying module 108.

Figure 6:
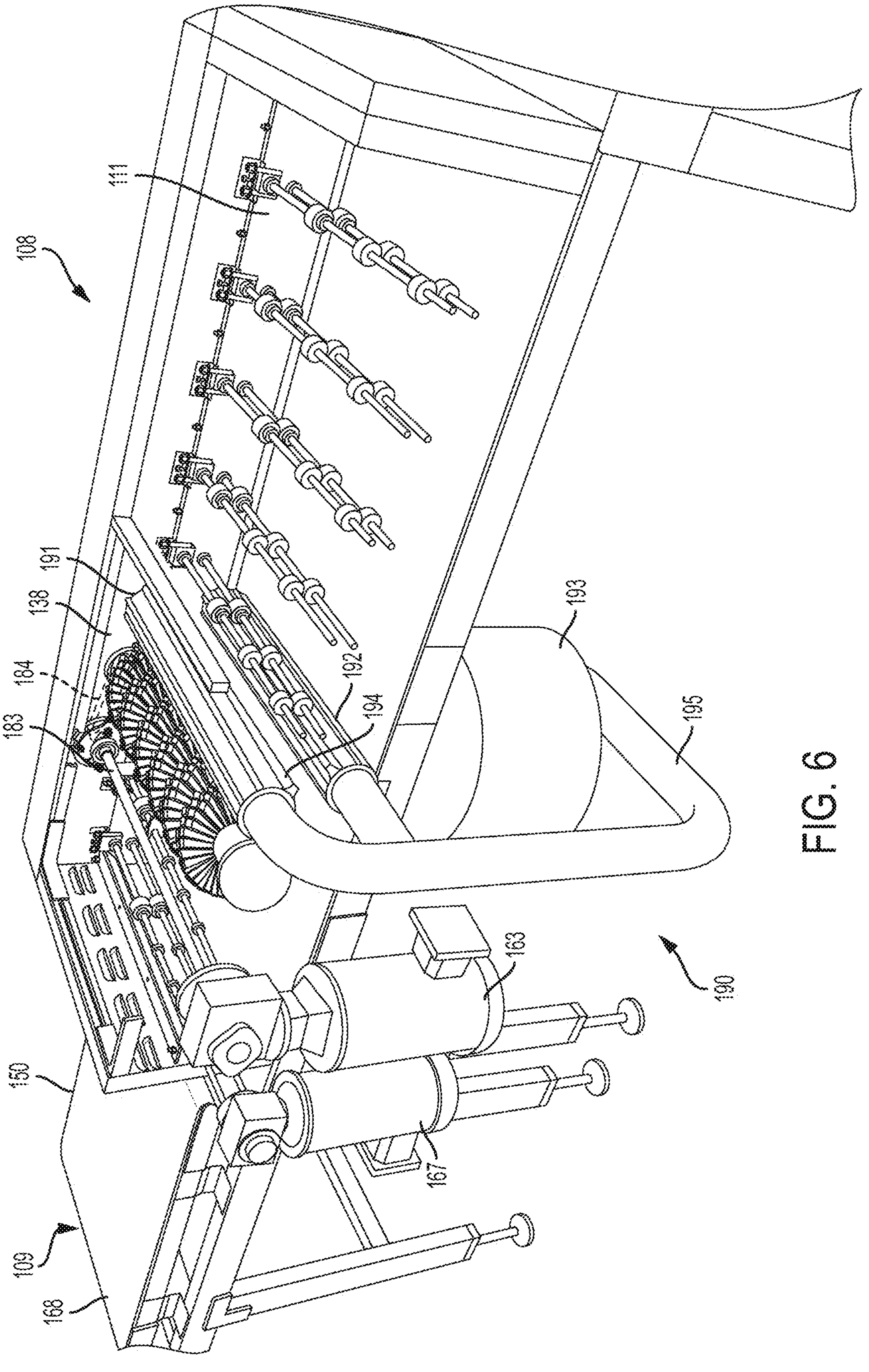
FIG. 6 is a perspective view of a drying module and an exit module of a substrate cleaning system.

Referring now to FIG. 6, the drying module 108 and the unloading module 109 are shown in perspective view. As shown in FIG. 6, a side portion of the substrate cleaning machine 100 has been removed in order to provide a better view of the inner workings of the substrate cleaning system 100. The drying module 108 includes a plurality of automated rollers 111, an air knife system 190, an upper drying brush 138, and a motor 163. The plurality of automated rollers 111 of the drying module 108 are driven by a motor 167. The plurality of automated rollers 111 of the drying module 108 convey the product 10 through drying module 108. The air knife system 190 includes an upper air knife 191, a lower air knife 192, and an air pump 193. The upper air knife 191 and the lower air knife 192 are disposed above and below the plurality of automated rollers 111 of the drying module 108 to permit the product 10 to pass between the upper air knife 191 and the lower air knife 192. The upper air knife 191 and the lower air knife 192 each includes a tube with a slit 194 that spans the width of the tube. The upper air knife 191 and the lower air knife 192 are connected to the air pump 193 via an air tube 195. Each air knife is fed forced air from the air pump 193 and directs the forced air at a high velocity towards the product 10 to blow chemicals, deposits, debris, etc. and any remaining first cleaning solution 120 or second cleaning solution 125 from the product 10. In a typical embodiment, each air knife is angled towards the product 10 in a direction opposite to the movement of the product 10. Positioning each air knife in this way blows chemicals, deposits, debris, etc. and solution away from an exit 134 of the drying module 108. In another embodiment, each of the upper air knife 191 and the lower air knife 192 can be angled perpendicular to the product 10 or angled in the same direction as the movement of the product 10.

As discussed above, the plurality of automated rollers 111 of the drying module 108 include the upper rollers 113 and the lower rollers 112. Using the upper rollers 113 and the lower rollers 112 secures the product 10 as the product 10 passes through the upper air knife 191 and the lower air knife 192. Without the upper roller 113, the product 10 could be displaced by the high-velocity air that is directed towards the product 10 by the air knife system 190.

After passing through the air knife system 190, the product 10 passes beneath the upper drying brush 138. In a typical embodiment, the upper drying brush 138 includes helical bristles. In another embodiment, the upper drying brush 138 includes a cotton buff brush. A height of the upper drying brush 138 can be adjusted to change an amount of contact between the upper drying brush 138 and the product 10. In a typical embodiment, the height of the upper drying brush 138 is such that sufficient contact is made with the product 10 to contact the surface of the product 10 as the product 10 passes by the upper drying brush 138.

Figure 8:
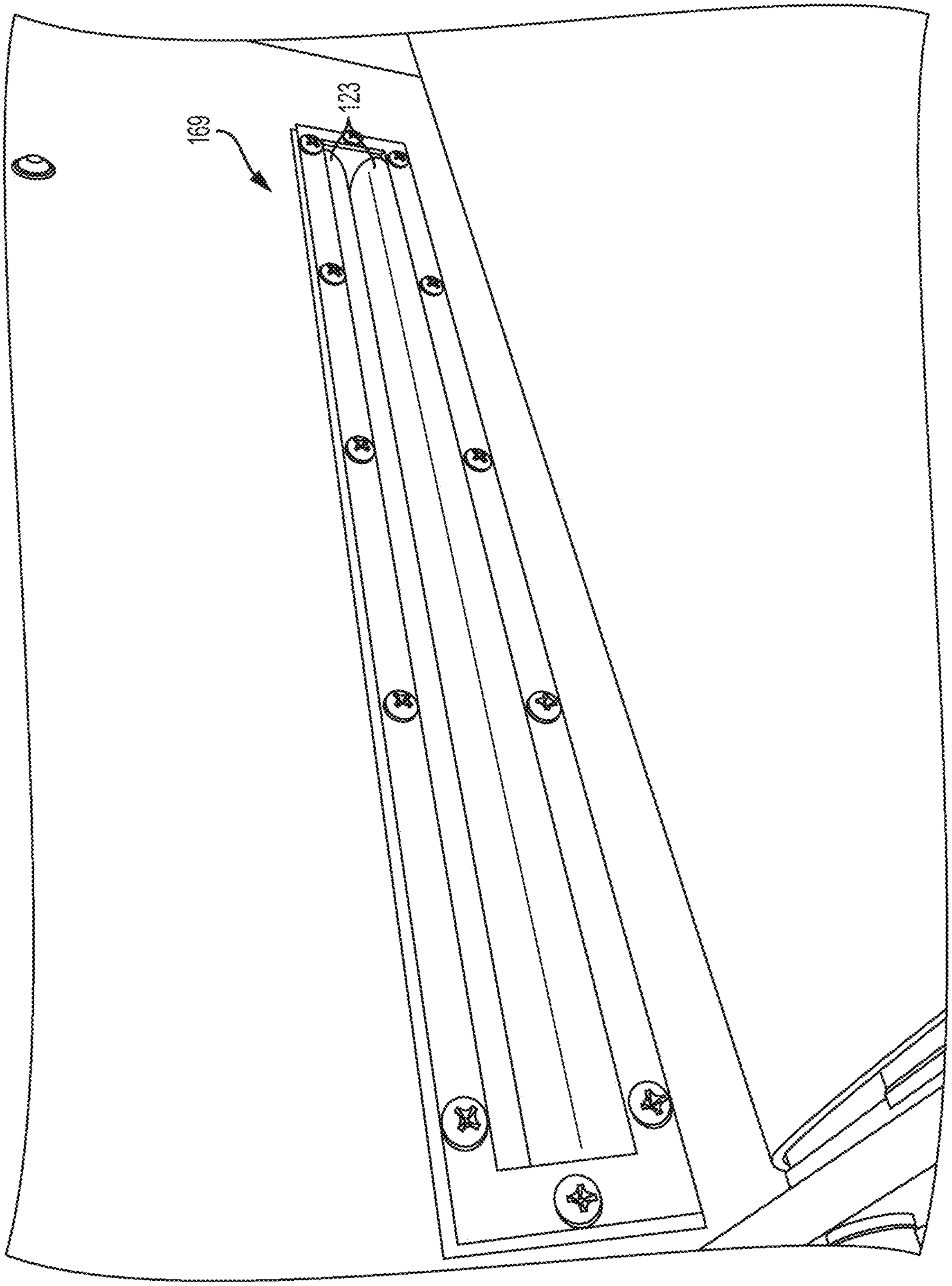
FIG. 8 is a perspective view of a doorway seal of a substrate cleaning system.

The upper drying brush 138 is driven by the motor 163 via a drive shaft 183 and a belt 182. The lower drying brush 139 is also driven by the motor 163 by a drive shaft 183 and a belt 184. Though not explicitly shown in FIG. 6, a lower drying brush may optionally be included in the drying module 108. In such an embodiment, the lower drying brush may be driven by the motor 163 similar to how the lower brush 130 of the rinsing module 106 is driven. Next, the product 10 exits the drying module 108 through the exit 134 and enters the unloading module 109. The exit 134 includes a doorway seal, such as the one as shown in FIG. 8.

The unloading module 109 includes an unloading zone 150, a conveyor motor (not shown), and a conveyor 168. The conveyor 168 is driven by the conveyor motor. The conveyor 168 conveys the product 10 from the drying module 108 to the unloading zone 150. As the product 10 enters the unloading zone 150, a user can pick up the product 10 and remove the product 10 from the substrate cleaning system 100. In a typical embodiment, the unloading module 109 also includes a product detector similar to product detector 140 from the loading module 101. If a product 10 is not removed from the unloading zone 150, the product detector sends a signal to the controller 301 to stop the process until the product 10 is removed. The product detector can include various sensors, including, for example, optical, weight based, etc. In another embodiment, removal of the product 10 from the unloading zone 150 may be automated by robots or the like.

Figure 7A:
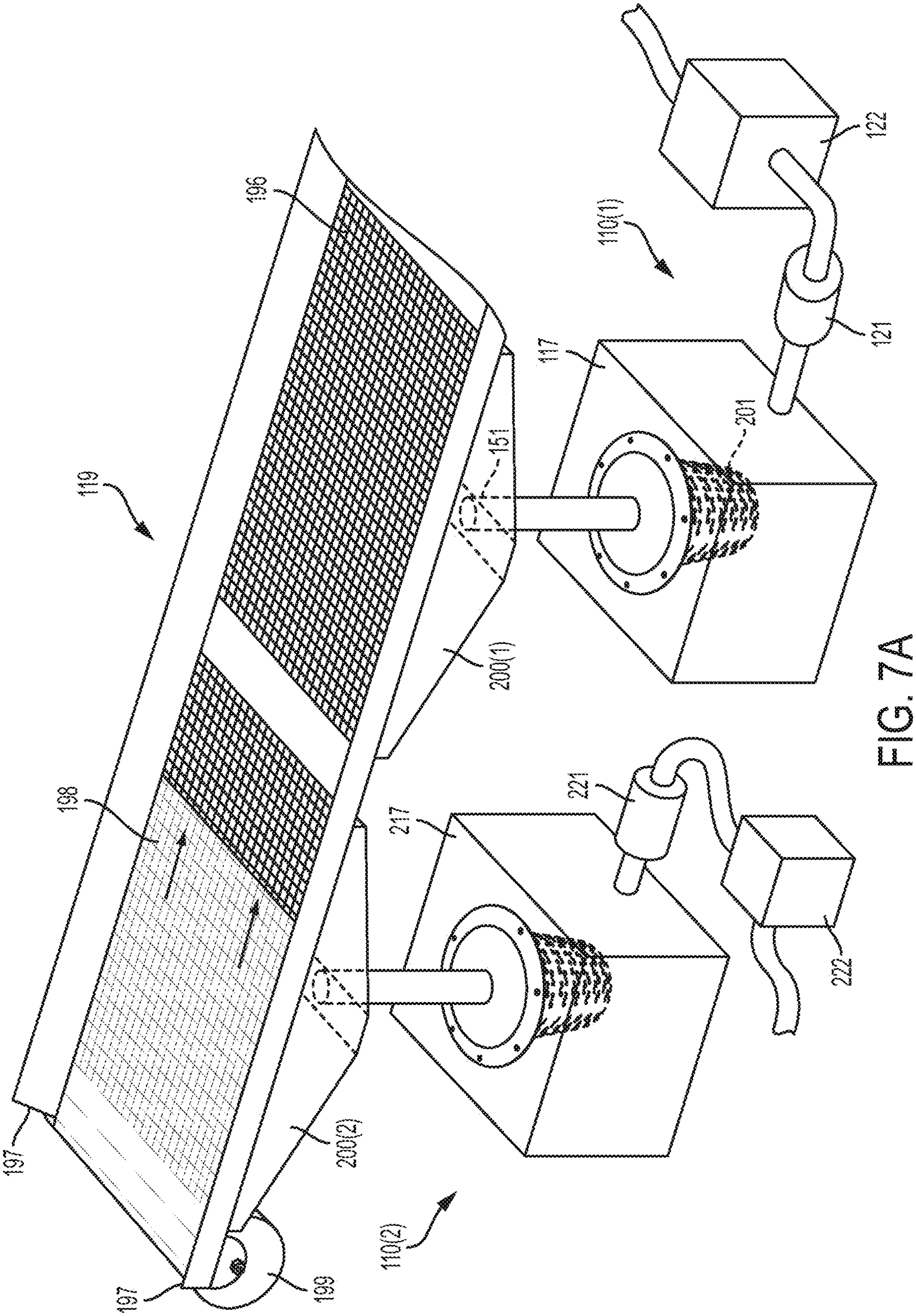
FIG. 7A is a perspective view of fluid filtering system of a substrate cleaning system.
Figure 7B:
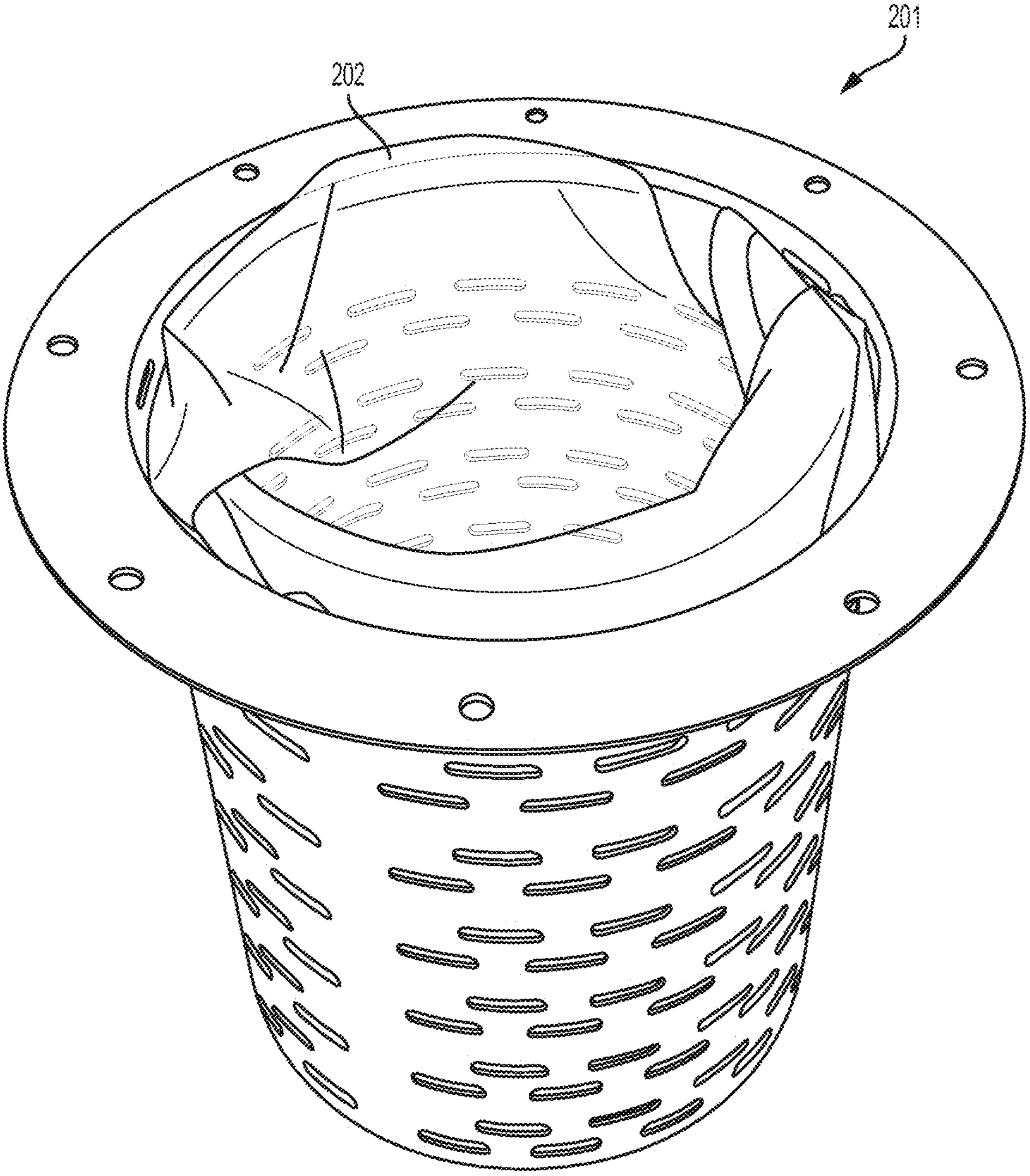
FIG. 7B is a perspective view of fluid filter of a substrate cleaning system.

Referring now to FIGS. 7A and 7B, the solution storage and filtering module 110(1) and the solution storage and filtering module 110(2) are shown in perspective view. As shown in FIGS. 7A and 7B, the breaking module 102, the scrubbing module 104, and the rinsing module 106 have been removed from above the solution storage and filtering module 110(1) and the solution storage and filtering module 110(2) in order to provide a better view of the inner workings of the substrate cleaning system 100. The solution storage and filtering module 110(1) is generally disposed beneath the breaking module 102 and the scrubbing module 104 and includes a tank 117, a pump 121, a heat exchanger 122, and a portion of a filtration system 119. The filtration system 119 extends beneath each of the breaking module 102, the scrubbing module 104, and the rinsing module 106. The filtration system 119 includes a grate 196, runoff guides 197, a filter media 198, a filter-media dispenser 199, a collection tray 200(1), and a collection tray 200(2). The filter media 198 is sheet of fibrous material that acts as a strainer to filter debris etc. that has runoff of the product 10 as the product 10 passes through the breaking module 102 and the scrubbing module 104. The filter media 198 is fed through the filtration system 119 from the filter-media dispenser 199 to a filter media collector 211 (best seen in FIG. 12). The filter-media dispenser 199 includes a roll of the filter media 198. Various materials can be used for the filter media 198, such as, for example, polypropylene, polyester, cellulose, vinyl, and the like. In one embodiment, the filter media 198 is continuously fed from the filter-media dispenser 199 to the filter media collector 211 to ensure that the filter media 198 does not become over saturated with debris etc. In another embodiment, the filter media 198 is fed periodically from the filter-media dispenser 199 to the filter media collector 211.

In operation, runoff that includes the first cleaning solution 120 and debris that has been removed from the product 10 falls from the breaking module 102 and the scrubbing module 104. The falling runoff either lands on top of the filter media 198 or is directed onto the filter media 198 by the runoff guides 197. The filter media 198 collects the debris that has been freed from the product 10, but permits the first cleaning solution 120 to pass through. The first cleaning solution 120 that passes through the filter media 198 also passes through the grate 196 and is collected in the collection tray 200(1) that sits directly below the grate 196. The grate 196 acts as a support for the filter media 198 and also prevents any large debris from passing through the grate 196. The collection tray 200(1) includes a drain 151 that directs the first cleaning solution 120 into the tank 117.

Upon entering the tank 117, the first cleaning solution 120 enters a filter basket 201. In a typical embodiment, the filter basket 201 is a perforated metal basket that includes a removable filter bag 202. The filter basket 201 and the removable filter bag 202 serve as an additional filtration measure to ensure that the first cleaning solution does not contain debris etc. that could clog the various fluid lines, the plurality of nozzles 118, or the pump 121. After the substrate cleaning system 100 has been running for a period of time, it may be necessary to replace or clean the removable filter bag 202 to remove the debris that has built up over time. After the first cleaning solution 120 passes through the filter basket 201 and the removable filter bag 202, the first cleaning solution 120 is pulled from the tank 117 by the pump 121. The pump 121 then directs the first cleaning solution 120 to the heat exchanger 122. The heat exchanger 122 includes provisions for adding heat to or removing heat from the first cleaning solution 120. Upon exiting the heat exchanger 122, the first cleaning solution 120 is fed into a plurality of the nozzles 118 and the cycle then repeats itself.

The solution storage and filtration system 110(2) is disposed beneath the rinsing module 106 and operates in the substantially the same fashion as solution storage and filtration system 110(1), but operates to filter and recycle the second cleaning solution 125 that is used in the rinsing module 106. Using two filtration systems is typically necessary if the first cleaning solution 120 and the second cleaning solution 125 are used. In such an embodiment, it may be desirable to keep the cleaning solutions 120 and 125 separated. In another embodiment, the first cleaning solution 120 and the first cleaning solution 125 can be the same solvent. In such an embodiment, one filtration system that collects the first cleaning solution 120 and the second cleaning solution 125 into a single collection tray may be used instead of two filtration systems. In another embodiment, additional filtration systems may be used throughout the substrate cleaning system 100 as desired.

Referring now to FIG. 8, an exemplary doorway seal 169 is shown in perspective view. The doorway seal 169 shown in FIG. 8 demonstrates the kind of seal that may be used, for example, as the entrance slit 143 or the scrubbing module exit 137. The doorway seal 169 includes a pair of sealing members 123. Each of the pair of sealing members 123 is made of a pliable material that extends away from an opening of the doorway seal and presses against the opposite sealing member 123. As arranged, the pair of sealing members 123 is able to permit the product 10 to pass between the pair of sealing members while substantially maintaining a seal around the product 10. Sealing the product 10 as the product 10 passes through the doorway seal 169 minimizes an amount of VOC that may escape the substrate cleaning system 100.

Figure 10A:
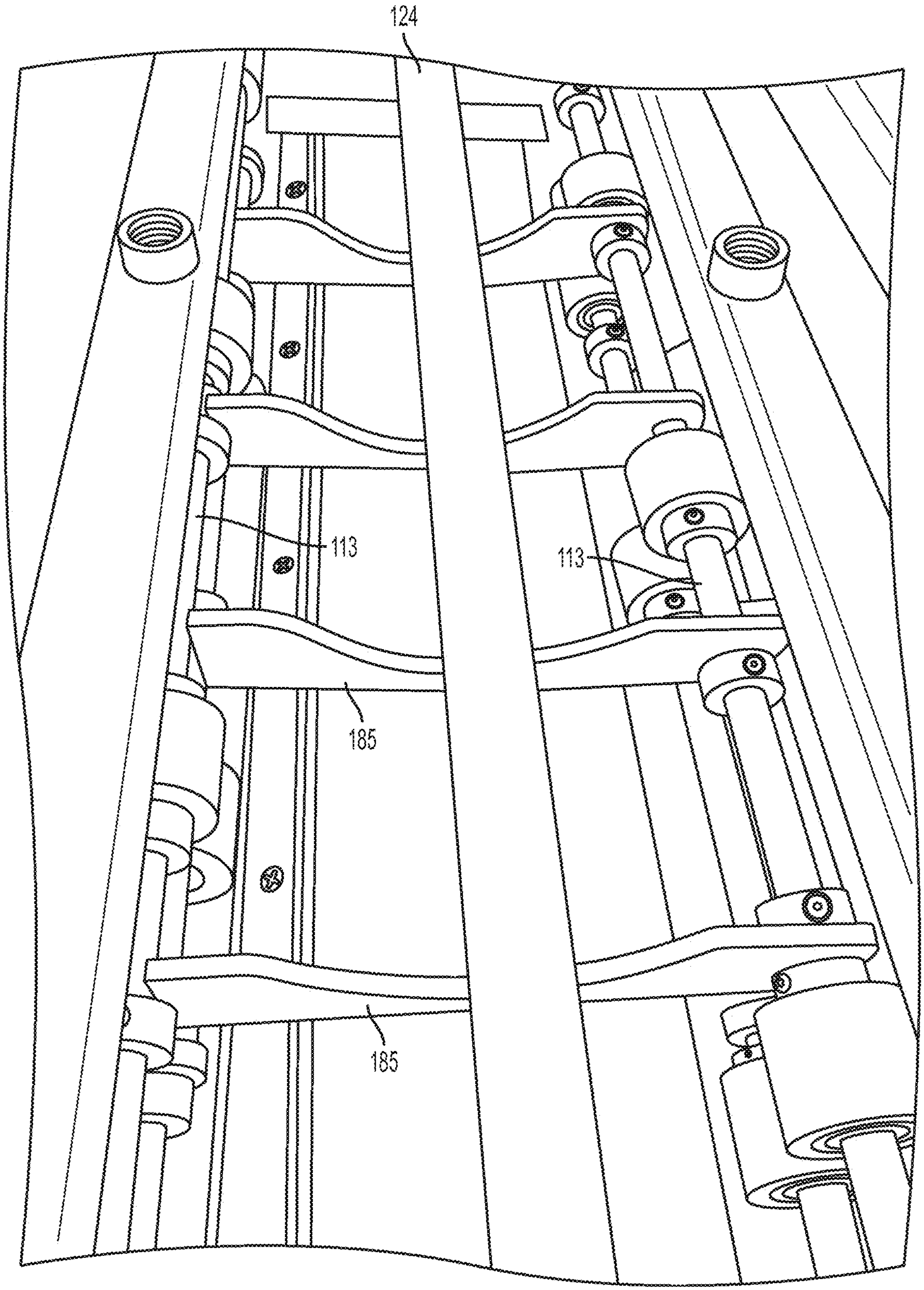
FIG. 10A is a perspective view of a support installed in a substrate cleaning system.
Figure 10B:
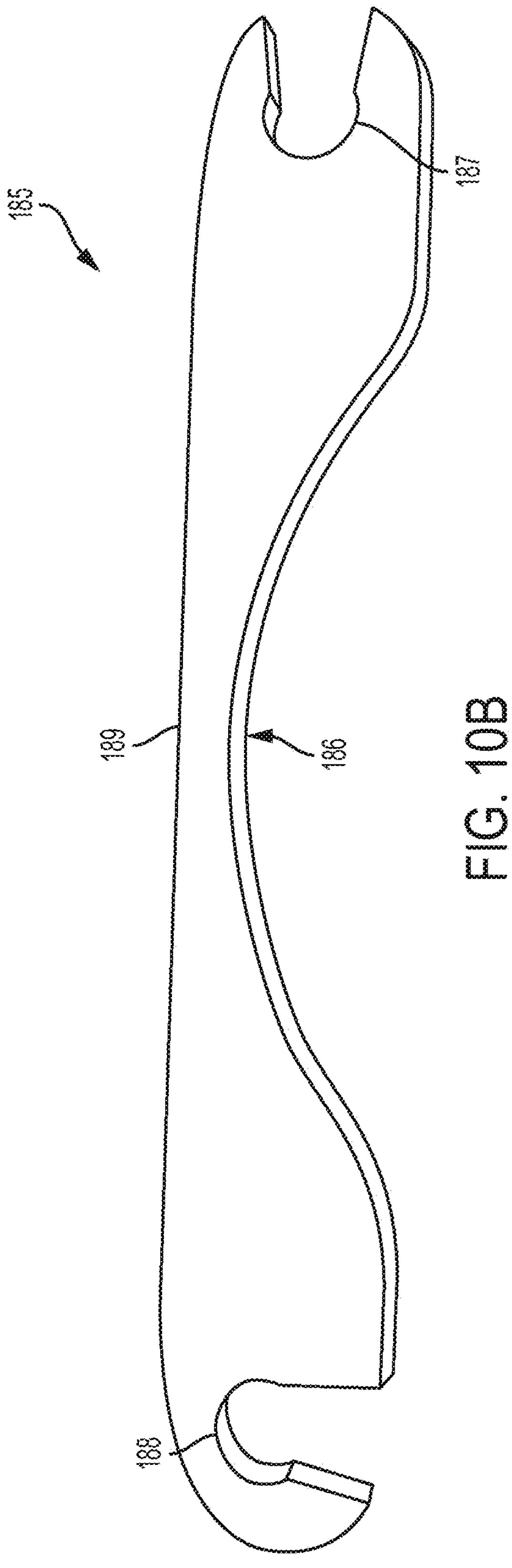
FIG. 10B is a side view of a support.

Referring now to FIGS. 10A and 10B, a support 185 is shown installed between a pair of automated rollers 111. The support 185 includes a drive shaft cutout 186, a first slot 187, a second slot 188, and a flat edge 189. The support 185 can be installed between any two pairs of adjacent lower rollers 112 or adjacent upper rollers 113 throughout the substrate cleaning system 100. The first slot 187 and the second slot 188 include a circular portion that snaps onto a diameter of a lower roller 112 or an upper roller 113. Snapping the support 185 onto pairs of adjacent upper rollers 113 or pairs of adjacent lower rollers 112 secures the support 185 in place. The snap fitment also permits the pair of adjacent rollers to rotate within the first slot 187 and the second slot 188, respectively, while maintaining securement of the support 185 between the pair of adjacent rollers. When installed, the support 185 acts as a guide that prevents the product 10 from bending and escaping the plurality of automated rollers 111. For example, when the product 10 approaches a rotating brush, it is possible for a leading edge the product 10 to be pushed away from the brush. If the leading edge of the product 10 is sufficiently deflected, the product 10 may be directed outside a path of the plurality of the automated rollers 111. Installing one or more supports 185 can prevent this from happening. As shown in FIG. 10A, several supports 185 are installed between a pair of adjacent upper rollers 113 and beneath a drive shaft 124. When installed between a pair of adjacent upper rollers 113, the flat edge 189 faces down. When the support 185 is installed between adjacent pairs of lower rollers 112, the flat edge 189 faces up. In some embodiments, no supports 185 may be necessary in order to successfully operate the substrate cleaning system 100. In other embodiments, it may be necessary to use one or more supports 185 to prevent the product 10 from bending out of alignment with the plurality of automated rollers 111.

Figure 11:
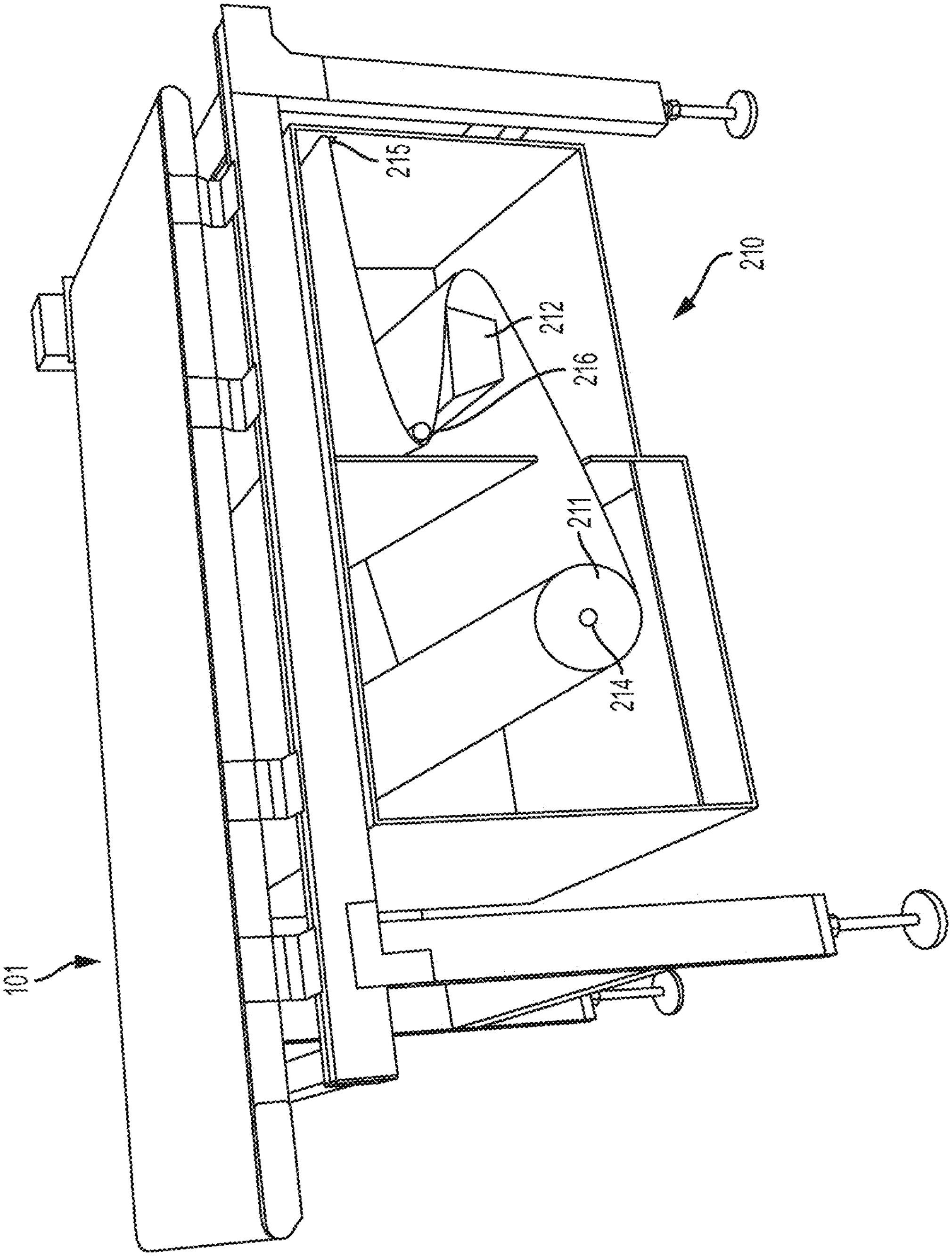
FIG. 11 is a perspective view of a filter media collection system of a substrate cleaning system.

Referring now to FIG. 11, a perspective view of a filter media collection system 210 of a substrate cleaning system 100 is shown. As shown in FIG. 11, a pair of doors of the filter media collection system 210 has been removed in order to provide a better view of the inner workings of the substrate cleaning system 100. The filter media collection system 210 resides underneath the loading module 101 and includes a filter media collector 211, a debris tray 212, and a motor 213 (best seen in FIG. 2). The filter media collection system 210 interacts with the filtration system 119 to pull the filter media 198 through the filtration system 119. The filter media 198 enters the filter media collection system 210 through a slit 215. The filter media 198 is fed through the slit 215 from the filtration system 119, a portion of which filtration system 119 abuts the slit 215. Pulling of the filter media 198 is accomplished with the motor 213. The motor 213 includes a drive shaft 214 that extends into the filter media collection system 210. When the motor 213 turns the drive shaft 214, the filter media 198 is wrapped around the drive shaft 214, which wrapping draws the filter media 198 into the filter media collection system 210. As the filter media 198 is pulled through the filter media collection system 210, the filter media 198 travels around a rod guide 216 and then is pulled around an edge of the debris tray 212. The edge of the debris tray 212 acts to scrape any debris etc. off of the filter media 198 before the filter media 198 is rolled up by the drive shaft 214. The debris tray 212 collects the scraped off debris and the debris tray 212 is also removable from the filter media collection system 210 to facilitate removal of the collected debris.

Figure 12:
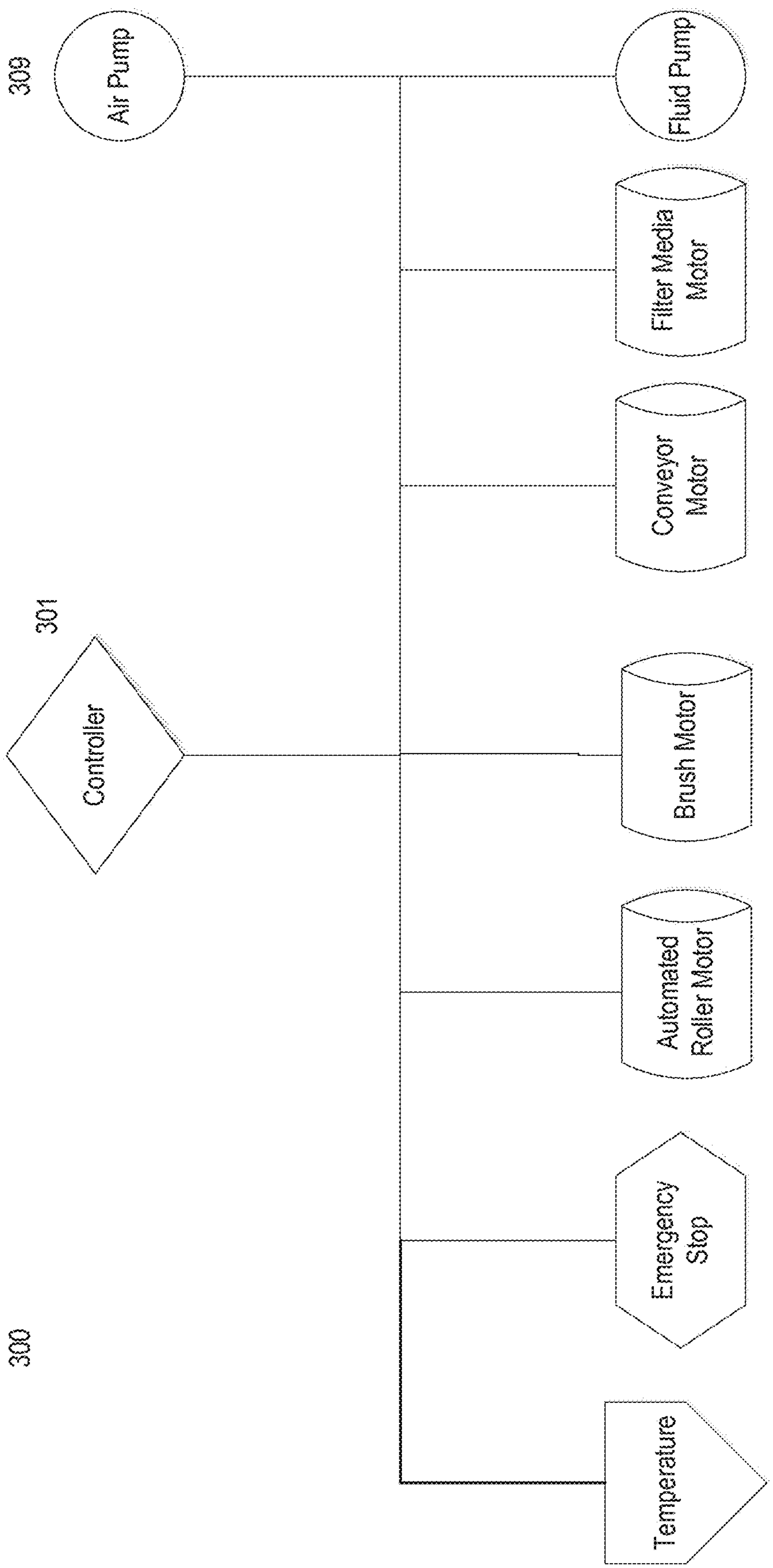
FIG. 12 is a system control diagram of a substrate cleaning system.

Referring now to FIG. 12, a system control diagram of a substrate cleaning system 100 is shown. The substrate cleaning system 100 includes a control system 300 that is operable to control various parameters of the substrate cleaning system 100. For example, the control system 300 controls and monitors parameters relating to a temperature sensor 302, an emergency stop 303, an automated roller motor 304, a brush motor 305, a conveyor motor 306, a filter media motor 307, a pump 308, and an air pump 309. In a typical embodiment, the controller 301 includes a controller cabinet that houses a series of programmable logic controllers, variable speed drives, and input/output controllers. The programmable logic controllers, the variable speed drives, and the input/output controllers enable the controller 301 to control communicate with and control each of the temperature sensor 302, the emergency stop 303, the automated roller motor 304, the brush motor 305, the conveyor motor 306, the filter media motor 307, the pump 308, and the air pump 309

In a typical embodiment, the controller 301 is wired to at least one temperature sensor 302 associated with the substrate cleaning system 100. For example, the temperature sensor 302 may be placed in one of the tanks or heat exchangers associated with the solution storage and filtering module 110(1). In response to monitoring the temperature sensor 302, the controller 301 can communicate with the heat exchanger 122 to raise or lower a temperature of the first cleaning solution 120 as needed. In another embodiment, additional temperature sensors can be added as desired. For example, an additional temperature sensor may be included in the solution storage and filtering module 110(2) to enable the controller 301 to control a temperature of the second cleaning solution 125.

In a typical embodiment, the controller 301 is wired to at least one emergency stop 303. For example, the emergency stop 303 may be in the form of a button that can be pressed by a user to alert the controller 301 that the substrate cleaning system 100 must be stopped immediately. In response to receiving such a signal, the controller 301 can cut power to the substrate cleaning system 100. In another embodiment, additional emergency stops 303 can be added as desired. The light curtain 141 is another example of an emergency stop 303 that may be connected to the controller 301.

In a typical embodiment, the controller 301 is wired to at least one automated roller motor 304. The controller 301 can control the speed of the automated roller motor 304 by altering an amount of current the motor 304 receives. The controller 301 can also monitor the power being consumed by the automated roller motor 304. By monitoring the power consumed by the automated roller motor 304, the controller 301 can detect potential problems. For example, if a power spike occurs at the automated roller motor 304, the controller 301 can shut down the substrate cleaning system 100. A power spike may indicate, for example, that the product 10 has become jammed in the automated rollers. Quickly identifying this problem and shutting the substrate cleaning system 100 down can prevent further damage. In another embodiment, the controller 301 may be wired to as many automated roller motors 304 as the substrate cleaning system 100 contains. The motor 135 discussed above is an example of an automated roller motor 304.

In a typical embodiment, the controller 301 is wired to at least one brush motor 305. The controller 301 can control the speed of the brush motor 305 by altering an amount of current the brush motor 305 receives. The controller 301 can also monitor the power being consumed by the brush motor 305. By monitoring the power consumed by the brush motor 305, the controller 301 can detect potential problems. For example, if a power spike occurs at the brush motor 305, the controller 301 can shut down the substrate cleaning system 100. A power spike may indicate, for example, that a brush motor 305 has become jammed. Quickly identifying this problem and shutting the substrate cleaning system 100 down can prevent further damage. In another embodiment, the controller 301 may be wired to as many brush motors 305 as the substrate cleaning system 100 contains. The motor 156 discussed above is an example of a brush motor 305.

In a typical embodiment, the controller 301 is wired to at least one conveyor motor 306. The controller 301 can control the speed of the conveyor motor 306 by altering an amount of current the conveyor motor 306 receives. The controller 301 can also monitor the power being consumed by the conveyor motor 306. By monitoring the power consumed by the conveyor motor 306, the controller 301 can detect potential problems. For example, if a power spike occurs at the conveyor motor 306, the controller 301 can shut down the substrate cleaning system 100. A power spike may indicate, for example, that a conveyor motor 306 has become jammed. Quickly identifying this problem and shutting the substrate cleaning system 100 down can prevent further damage. In another embodiment, the controller 301 may be wired to as many conveyor motors 306 as the substrate cleaning system 100 contains. The motor 153 discussed above is an example of a conveyor motor 306.

In a typical embodiment, the controller 301 is wired to at least one filter media motor 307. The controller 301 can control the speed of the filter media motor 307 by altering an amount of current the filter media motor 307 receives. The controller 301 can also monitor the power being consumed by the filter media motor 307. By monitoring the power consumed by the filter media motor 307, the controller 301 can detect potential problems. For example, if a power spike occurs at the filter media motor 307, the controller 301 can shut down the substrate cleaning system 100. A power spike may indicate, for example, that a filter media motor 307 has failed and the filter media 198 is no longer being properly fed through the substrate cleaning system 100. Quickly identifying this problem and shutting the substrate cleaning system 100 down can prevent further problems. In another embodiment, the controller 301 may be wired to as many filter media motors 307 as the substrate cleaning system 100 contains. The motor 213 discussed above is an example of a filter media motor 307.

In a typical embodiment, the controller 301 is wired to at least one fluid pump 308. The controller 301 can control the flow rate of the fluid pump 308 by altering an amount of current the fluid pump 308 receives. The controller 301 can also monitor the power being consumed by the fluid pump 308. By monitoring the power consumed by the fluid pump

308, the controller 301 can detect potential problems. For example, if a power spike occurs at the fluid pump 308, the controller 301 can shut down the substrate cleaning system 100. A power spike may indicate, for example, that a fluid pump 308 has become clogged. Quickly identifying this problem and shutting the substrate cleaning system 100 down can prevent further damage. In another embodiment, the controller 301 may be wired to as many fluid pumps 308 as the substrate cleaning system contains. The pump 121 discussed above is an example of a fluid pump 308.

In a typical embodiment, the controller 301 is wired to at least one air pump 309. The controller 301 can control the flow rate of the air pump 309 by altering an amount of current the air pump 309 receives. The controller 301 can also monitor the power being consumed by the air pump 309. By monitoring the power consumed by the air pump 309, the controller 301 can detect potential problems. For example, if a power spike occurs at the air pump 309, the controller 301 can shut down the substrate cleaning system 100. A power spike may indicate, for example, that an air pump 309 has become clogged. Quickly identifying this problem and shutting the substrate cleaning system 100 down can prevent further damage. In another embodiment, the controller 301 may be wired to as many air pumps 309 as the substrate cleaning system contains. The air pump 193 discussed above is an example of an air pump 309.

In a typical embodiment, the controller 301 enables different program sequences or recipes to be created. For example, the controller 301 can be programmed with a first recipe. The first recipe may, for example, direct the substrate cleaning system to: maintain a fluid temperature of 95 degrees Fahrenheit; advance a product 10 through substrate cleaning system 100 at 50 inches per minute; and rotating brushes within the substrate cleaning system 100 at a speed of 300 revolutions per minute. The controller 301 can be programmed to include a second recipe that alters one or more of the parameters of the first recipe. For example, after running a batch of a first product 10 through the substrate cleaning system 100, a second batch of a second type of product 10 may be run through the substrate cleaning system 100 according to parameters of the second recipe. The second type of product 10 may have a different type of masking material deposited on its surface that requires more or less time in the substrate cleaning system 100. The ability for the controller 301 to store multiple recipes makes it relatively easy to switch system parameters as needed. In another embodiment, the controller 301 allows a user to individually adjust one or more of the following parameters to create a custom recipe: a speed of one or more pumps; a speed and direction of or one or more brushes; a temperature of one or more fluids; a speed of one or more conveyor motors; and a speed of one or more air blowers.

Figure 13:
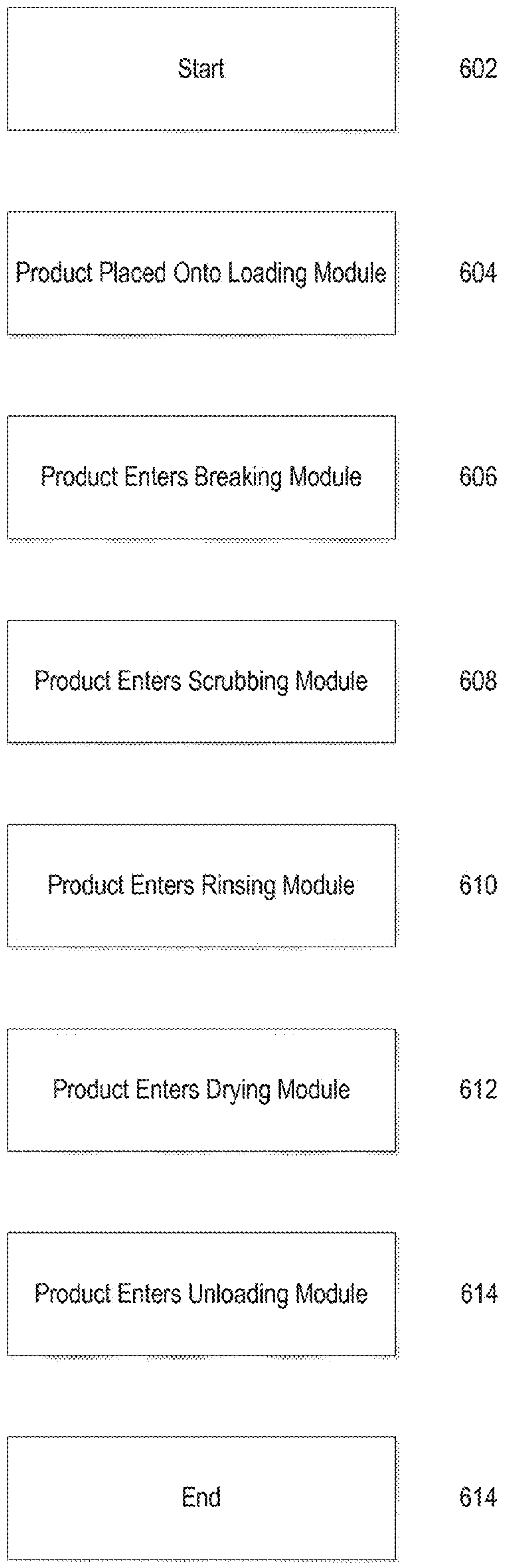
FIG. 13 is a flow diagram of a method of using a substrate cleaning system.

Referring now to FIG. 13, a flow diagram of a process of using the substrate cleaning system 100 is shown. A process 600 for cleaning a product 10 using the substrate cleaning system 100 begins at a step 602. The process 600 is generally described above with respect to FIGS. 1-12 and is further described below.

At a step 604, the product 10 is placed into the loading module 101. Upon being placed into the loading module 101, the product detector 140 detects the product 10 and the product 10 is conveyed by conveyor 116 into breaking module 102 through the entrance slit 143.

At a step 606, the product 10 enters the breaking module 102. The product 10 is conveyed through the breaking module 102 by the plurality of automated rollers 111 of the breaking module 102. Throughout a length of the breaking module 102, the product 10 is covered with the first cleaning solution 120 by the plurality of nozzles 118. The first cleaning solution 120 pools on the top surface of the product 10 and breaks down deposits and residue on surfaces of the product 10. The plurality of automated rollers 111 convey the product 10 at an appropriate speed to allow the cleaning solution 120 enough time to break down deposits, chemicals, deposits, debris, etc. on a surface of the product 10.

At a step 608, the product 10 enters the scrubbing module 104. The product 10 is conveyed through the scrubbing module 104 by the plurality of automated rollers 111 of the scrubbing module 104. Within the scrubbing module 104, the product 10 passes beneath the first upper spiral brush 149, the second upper spiral brush 154, and passes over the lower brush 159. The first upper spiral brush 149 and the second upper spiral brush 154 scrub the top surface of the product 10 to break up, loosen, and remove chemicals, deposits, debris, etc. from the top surface of the product 10. The lower brush 159 scrubs the bottom surface of the product 10 to break up, loosen, and remove chemicals, deposits, debris, etc. from the bottom surface of the product 10.

At a step 610, the product 10 enters the rinsing module 106. The product 10 is conveyed through the rinsing module 106 by the plurality of automated rollers 111 of the rinsing module 106. As the product 10 enters the rinsing module 106, the product 10 passes beneath the upper brush 131 and above the lower brush 130. The upper brush 131 and the lower brush 130 scrub the top and bottom surfaces, respectively, of the product 10 to remove chemicals, deposits, debris, etc. therefrom. Throughout a length of the rinsing module 106, the product 10 is sprayed with the second cleaning solution 125 by the plurality of nozzles 132 to flush away additional chemicals, deposits, debris, etc. from the product 10.

At step 612, the product 10 enters the drying module 108. The product 10 is conveyed through the drying module 108 by the plurality of automated rollers 111 of the drying module 108. Within the drying module 108, the product 10 passes through the air knife system 190. As discussed above, the air knife system 190 includes an upper air knife 191 and a lower air knife 192 that are disposed such that the product 10 passes between them. As the product 10 passes through the upper air knife 191 and the lower air knife 192, pressurized air is blown at the product 10 at a high velocity to remove any remaining cleaning solution 120 or 125 from the product 10. Prior to exiting the drying module 108, the product 10 then passes beneath the upper drying brush 138. The upper drying brush 138 aids in the removal of any remaining moisture from the product 10.

At a step 614, the product 10 enters the unloading module 109. At the unloading module 109, a user picks up the product 10 and the process 600 ends at a step 616. In another embodiment, removal of the product 10 is automated through the use of robots or other automated mechanisms.

Although various embodiments of the method and system of the present invention have been illustrated in the accompanying Drawings and described in the foregoing Specification, it will be understood that the invention is not limited to the embodiments disclosed, but is capable of numerous rearrangements, modifications, and substitutions without departing from the spirit and scope of the invention as set forth herein. It is intended that the Specification and examples be considered as illustrative only.

What is claimed is:

1. A system for cleaning substrates, the system comprising:

a conveyor system comprising:

a plurality of lower rollers; and a motor that drives at least one of the plurality of lower rollers;

an upper sprayer positioned above the conveyor system to apply a fluid to a top surface of a metal sheet that passes beneath the upper sprayer;

an upper brush positioned above the conveyor system and positioned to contact the top surface of the metal sheet; and a fluid collector module positioned beneath the conveyor system and comprising:

a collection tray disposed beneath the upper sprayer for receiving the fluid that has run off the metal sheet;

an automated filter media disposed within a filtration system, the filtration system positioned below the upper sprayer and comprising a grate, runoff guides, a filter-media dispenser, and the collection tray, wherein the collection tray is disposed below the grate and is connected to a filtering module disposed beneath the collection tray, the filtering module comprising a pump, a tank having a filter basket disposed therein, and a heat exchanger; and wherein the pump is fluidly coupled to the heat exchanger and the tank and is in fluid communication with the upper sprayer and the collection tray, wherein the automated filter media is disposed between the upper sprayer and the collection tray.

2. The system of claim 1, wherein the conveyor system comprises a plurality of upper rollers positioned above the plurality of lower rollers.

3. The system of claim 1, comprising a lower sprayer positioned below the conveyor system to apply the fluid to a bottom surface of the metal sheet.

4. The system of claim 3, wherein the lower sprayer comprises an under sprayer comprising a planar guide portion, the planar guide portion being positioned beneath a plane that extends from a top portion of each of the plurality of lower rollers.

5. The system of claim 1, comprising a lower brush positioned to contact a bottom surface of the metal sheet.

6. The system of claim 1, comprising an upper brush fender comprising a fluid manifold, the fluid manifold comprising a fluid outlet oriented to convey fluid onto the upper brush.

7. The system of claim 1, wherein the fluid collector module comprises a filter-media collector that pulls the filter media across at least a portion of the collection tray to provide new filter media for filtering debris from the fluid.

8. The system of claim 1, wherein the heat exchanger heats or cools the fluid.

9. The system of claim 8, wherein the heat exchanger heats the fluid to a temperature not to exceed the fluid's boiling point.

10. The system of claim 1, comprising:

a loading module comprising:

a conveyor to carry the metal sheet into the system;

an entrance product detector to detect a presence of the metal sheet on the conveyor;

a light curtain to detect a presence of objects within the loading module other than the metal sheet; and an entrance seal that limits an amount of the fluid that escapes the system as the metal sheet enters the system.

11. The system of claim 1, comprising a programmable control unit operative to control at least one of a speed of the upper brush, a flow rate of the pump, a temperature of the fluid, and a speed of the motor.

12. A system for cleaning substrates comprising a plurality of programmable logic controllers, the system comprising:

wherein the programmable logic controllers are configured to:

convey a metal sheet to be cleaned through a substrate cleaning system via an automated conveyor, wherein the automated conveyor comprises at least a first upper sprayer;

spray, with the first upper sprayer, the metal sheet with a first cleaning solution, wherein a temperature of the first cleaning solution is maintained close to or below a boiling point of the first cleaning solution;

scrub the sprayed metal sheet with an automated brush;

rinse, with a second upper sprayer, the scrubbed metal sheet with a second cleaning solution, wherein a temperature of the second cleaning solution is maintained below a boiling point of the second cleaning solution;

dry the metal sheet by passing the metal sheet through a drying module;

provide an automated filter media disposed within a filtration system, the filtration system positioned below the first upper sprayer and comprising a grate, runoff guides, a filter media dispenser, and a collection tray, wherein the collection tray is disposed below the grate and is connected to a filtering module disposed beneath the collection tray;

collect debris on top of the automated filter media and onto the grate;

pass the first liquid through the automated filter media and through the grate;

direct the first liquid to the collection tray and into a tank for filtration;

pump the first filtered liquid from the tank to a heat exchanger; and direct the first filtered liquid to the first upper sprayer.

13. A system for cleaning substrates, the system comprising:

a conveyor system comprising:

a plurality of lower rollers;

an upper sprayer positioned above the conveyor system to apply a fluid to a top surface of a product that passes beneath the upper sprayer;

an upper brush positioned above the conveyor system and positioned to contact the top surface of the product; and a fluid collector module positioned beneath the conveyor system and comprising:

a collection tray disposed beneath the upper sprayer for receiving the fluid that has run off the product;

a filter media disposed between the upper sprayer and the collection tray;

a pump in fluid communication with the upper sprayer and the collection tray; and a heat exchanger in fluid communication with the pump and the upper sprayer and configured to heat the fluid to a temperature not to exceed the fluid's boiling point.

14. The system of claim 13, wherein the conveyor system comprises a motor that drives at least one of the plurality of lower rollers.

15. The system of claim 14, comprising a programmable control unit operative to control at least one of a speed of the upper brush, a flow rate of the pump, a temperature of the fluid, and a speed of the motor.

16. The system of claim 13, wherein the fluid collector module comprises:

a filter-media dispenser; and a filter-media collector that pulls the filter media across at least a portion of the collection tray to provide new filter media for filtering debris from the fluid.

17. The system of claim 13, comprising:

a loading module comprising:

a conveyor to carry the product into the system;

an entrance product detector to detect a presence of the product on the conveyor;

a light curtain to detect a presence of objects within the loading module other than the product; and an entrance seal that limits an amount of the fluid that escapes the system as the product enters the system.

18. The system of claim 13, comprising an air knife that blows air onto the product before the product exits the system.

19. The system of claim 13, comprising an unloading module comprising:

a conveyor to carry the product out of the system; and an exit product detector to detect the presence of the product on the conveyor.

20. The system of claim 13, comprising a support member adapted to connect between two adjacent lower rollers.

* * * * *